US012802423B2

(12) United States Patent
Athar et al.

(10) Patent No.: US 12,802,423 B2
(45) Date of Patent: Nov. 17, 2026

(54) MULTIMODAL FOUR-DIMENSIONAL PANOPTIC SEGMENTATION

(71) Applicant: WAABI Canada Inc., Toronto (CA)

(72) Inventors: Ali Athar, Toronto (CA); Enxu Li, Toronto (CA); Sergio Casas Romero, Toronto (CA); Raquel Urtasun, Toronto (CA)

(73) Assignee: Waabi Canada Inc., Toronto (CA)

( * ) Notice: Subject to any disclaimer, the term of this patent is extended or adjusted under 35 U.S.C. 154(b) by 127 days.

(21) Appl. No.: 18/736,525

(22) Filed: Jun. 6, 2024

(65) Prior Publication Data

US 2024/0412497 A1 Dec. 12, 2024

Related U.S. Application Data

(60) Provisional application No. 63/471,948, filed on Jun. 8, 2023.

(51) Int. Cl.
*G06V 10/80* (2022.01)
*G05D 1/242* (2024.01)
(Continued)

(52) U.S. Cl.
CPC ........... *G06V 10/806* (2022.01); *G05D 1/242* (2024.01); *G05D 1/2435* (2024.01); *G06V 10/26* (2022.01);
(Continued)

(58) Field of Classification Search
CPC .... G06V 10/806; G06V 10/26; G06V 10/757; G06V 10/7715; G06V 10/82; G06V 20/56; G06V 10/454; G06V 20/58; G06V 10/764; G06V 20/64; G06V 10/25; G06V 20/70; G06V 10/774; G06V 20/647; G06V 2201/07; G05D 1/242; G05D 1/2435; G05D 2111/14; G06T 2207/10028;
(Continued)

(56) References Cited

U.S. PATENT DOCUMENTS

| | | | | |
|---|---|---|---|---|
| 10,019,652 | B2 * | 7/2018 | Wang | G06T 7/20 |
| 10,408,939 | B1 * | 9/2019 | Kim | G06N 3/08 |

(Continued)

OTHER PUBLICATIONS

Weng, X., et al., "3D Multi-Object Tracking: A Baseline and New Evaluation Metrics", Jul. 22, 2020, 9 pages.

(Continued)

*Primary Examiner* — Michael S Osinski
(74) *Attorney, Agent, or Firm* — Lathrop GPM LLP

(57) ABSTRACT

A method implements multimodal four-dimensional panoptic segmentation. The method includes receiving a set of images and a set of point clouds and executing an image encoder model using the set of images to extract a set of image feature maps. The method further includes executing a point voxel encoder model using the set of image feature maps and the set of point clouds to extract a set of voxel features, a set of image features, and a set of point features and executing a panoptic decoder model using the set of voxel features, the set of image features, the set of point features, and a set of queries to generate a semantic mask and a track mask. The method further includes performing an action responsive to at least one of the semantic mask and the track mask.

18 Claims, 11 Drawing Sheets

(51) Int. Cl.

| | |
|---|---|
| ***G05D 1/243*** | (2024.01) |
| ***G05D 111/10*** | (2024.01) |
| ***G06V 10/26*** | (2022.01) |
| ***G06V 10/75*** | (2022.01) |
| ***G06V 10/77*** | (2022.01) |
| ***G06V 10/82*** | (2022.01) |

(52) U.S. Cl.

CPC ........ *G06V 10/757* (2022.01); *G06V 10/7715* (2022.01); *G06V 10/82* (2022.01); *G05D 2111/14* (2024.01)

(58) Field of Classification Search

CPC . G06T 2207/20084; G06T 2207/30252; G06T 7/246; G06T 2207/20081; G06T 2207/10024; G06T 7/11; G06T 2207/10016; G06T 7/12; G06T 7/20; G06N 3/045; G06N 3/0464; G06N 3/09; G06N 3/08; G06N 3/084; G06N 20/00; G06N 3/0455; G06N 3/0475; G06N 3/094; G06N 3/044

See application file for complete search history.

(56) References Cited

U.S. PATENT DOCUMENTS

| | | | | |
|---|---|---|---|---|
| 10,635,927 | B2 * | 4/2020 | Chen | G06V 10/82 |
| 11,801,865 | B2 * | 10/2023 | Stenson | G01S 17/42 |
| 11,904,892 | B2 * | 2/2024 | Stenson | B60W 60/0027 |
| 12,020,153 | B2 * | 6/2024 | Adrian | G06N 3/084 |
| 12,026,442 | B2 * | 7/2024 | Sun | G06F 30/27 |
| 12,037,027 | B2 * | 7/2024 | Suo | G06N 3/09 |
| 12,315,226 | B2 * | 5/2025 | Fazlali | G06V 10/7715 |
| 12,406,500 | B2 * | 9/2025 | Peng | G06F 40/10 |
| 12,429,878 | B1 * | 9/2025 | Cheng | G01S 17/89 |
| 2020/0074233 | A1 * | 3/2020 | Englard | G06V 20/56 |
| 2020/0082219 | A1 * | 3/2020 | Li | G06F 18/2148 |
| 2020/0160559 | A1 * | 5/2020 | Urtasun | G06N 3/084 |
| 2020/0273190 | A1 * | 8/2020 | Ye | G06T 7/579 |
| 2021/0158043 | A1 * | 5/2021 | Hou | G06V 10/454 |
| 2021/0192762 | A1 * | 6/2021 | Guan | G06V 20/64 |
| 2021/0326656 | A1 * | 10/2021 | Lee | G06F 18/217 |
| 2022/0134435 | A1 * | 5/2022 | Scime | B22F 10/80 264/112 |
| 2022/0157048 | A1 * | 5/2022 | Ting | G06N 3/084 |
| 2022/0215558 | A1 * | 7/2022 | Liu | G06T 7/13 |
| 2022/0383525 | A1 * | 12/2022 | Sabato | G06V 30/194 |
| 2023/0056784 | A1 * | 2/2023 | Zhang | G06V 20/58 |
| 2023/0086928 | A1 * | 3/2023 | Fang | G06T 15/506 382/103 |
| 2023/0098141 | A1 * | 3/2023 | Qi | G06V 20/56 382/104 |
| 2023/0104262 | A1 * | 4/2023 | Lin | G06T 7/11 382/173 |
| 2023/0121534 | A1 * | 4/2023 | Rukhovich | G06T 15/10 382/103 |
| 2023/0154185 | A1 * | 5/2023 | Kuen | G06V 10/751 382/100 |
| 2023/0274466 | A1 * | 8/2023 | Wei | G06V 10/7715 382/232 |
| 2023/0281824 | A1 * | 9/2023 | Mei | G06V 20/70 345/419 |
| 2023/0281826 | A1 * | 9/2023 | Schulter | G06V 10/761 382/173 |
| 2023/0377157 | A1 * | 11/2023 | Butler | A61B 6/032 |
| 2024/0020866 | A1 * | 1/2024 | Zuo | G06T 7/593 |
| 2024/0062520 | A1 * | 2/2024 | Park | G06V 20/56 |
| 2024/0127455 | A1 * | 4/2024 | Tang | G06T 7/12 |
| 2024/0212164 | A1 * | 6/2024 | Li | G06T 7/11 |
| 2024/0412497 | A1 * | 12/2024 | Athar | G06V 10/757 |
| 2024/0420408 | A1 * | 12/2024 | Shang | G06T 7/60 |
| 2025/0118010 | A1 * | 4/2025 | Jiang | G01S 17/89 |
| 2025/0133223 | A1 * | 4/2025 | Gaikov | H04N 19/147 |

OTHER PUBLICATIONS

Hurtado, J. V., et al., "MOPT: Multi-Object Panoptic Tracking", May 27, 2020, 10 pages.

Gasperini, S., et al., "Panoster: End-to-end Panoptic Segmantation of LiDAR Point Clouds", Feb. 12, 2021, 8 pages.

Chiu, H., et al., "Probabilistic 3D Multi-Modal, Multi-Object Tracking for Autonomous Driving", Oct. 11, 2021, 7 pages.

Sirohi, K., et al., "EfficientLPS: Efficient LiDAR Panoptic Segmentation", Nov. 4, 2021, 20 pages.

Zaech, J., et al., "Learnable Online Graph Representations for 3D Multi-Object Tracking", Apr. 23, 2021, 13 pages.

Li, E., et al., "SMAC-Seg: LiDAR Panoptic Segmantation via Sparse Multi-directional Attention Clustering", Apr. 31, 2021, 9 pages.

Zhao, Y., et al., "A Divide-and-Merge Point Cloud Clustering Algorithm for LiDAR Panoptic Segmantation", Sep. 16, 2021, 7 pages.

Yin, T., et al., "Multimodal Virtual Point 3D Detection", Nov. 12, 2021, 14 pages.

Mohan, R., et al., "7th AI Driving Olympics: 1st Place Report for Panoptic Tracking", Dec. 9, 2021, 6 pages.

Kreuzberg, L., et al., "4D-StOP: Panoptic Segmantation of 4D LiDAR using Spatio-temporal Object Proposal Generation and Aggregation", Sep. 29, 2022, 24 pages.

Su, S., et al., "PUPS: Point Cloud Unified Panoptic Segmentation", Feb. 28, 2023, 9 pages.

Xiao, Z., et al., "Position-Guided Point Cloud Panoptic Segmentation Transformer", Mar. 23, 2023, 16 pages.

Carion, N., et al., "End-to-End Object Detection with Transformers", May 28, 2020, 17 pages.

Yan, X., et al., "2DPASS: 2D Priors Assisted Semantic Segmentation on LiDAR Point Clouds", Oct. 14, 2022, 19 pages.

Athar, A., et al., "HODOR: Hight-Level Object Descriptors for Object Re-segmentation in Video Learned from Static Images", Jul. 15, 2022, 10 pages.

Aygun, M., et al., "4D Panoptic LiDAR Segmentation", Apr. 7, 2021, 11 pages.

Bai, X., et al., "TransFusion: Robust LiDAR-Camera Fusion for 3D Object Detection with Transformers", Mar. 22, 2022, 10 pages.

Chen, X., et al., "FUTR3D: A Unified Sensor Framework for 3D Detection", Apr. 15, 2023, 10 pages.

Cheng, R., et al., "(AF)2-S3Net: Attentive Feature Fusion with Adaptive Feature Selection for Sparse Semantic Segmentation Network", Feb. 8, 2021, 10 pages.

Cheng, B., et al., "Masked-Attention Mask Transformer for Universal Image Segmentation", Jun. 15, 2022, 10 pages.

Li, E., et al., "CPSeg: Cluster-Free Panoptic Segmentation of 3D LiDAR Point Clouds", Feb. 3, 2023, 7 pages.

Razani, R., et al., "GP-S3Net: Graph-Based Panoptic Sparse Semantic Segmentation Network", Feb. 3, 2023, 10 pages.

Hong, F., et al., "LiDAR-based Panoptic Segmentation via Dynamic Shifting Network", Dec. 1, 2020, 10 pages.

Li, Y., et al., "DeepFusion: LiDAR-Camera Deep Fusion for Multi-Modal 3D Object Detection", Mar. 15, 2022, 10 pages.

Li, J., et al., "MSeg3D: Multi-modal 3D Semantic Segmentation for Autonomous Driving", Mar. 15, 2023, 11 pages.

Li, J., et al., "Panoptic-PHNet: Towards Real-Time and High-Precision LiDAR Panoptic Segmentation via Clustering Pseudo Heatmap", Mar. 14, 2022, 10 pages.

Lin, T., et al., "Feature Pyramid Networks for Object Detection", Apr. 19, 2017, 9 pages.

Luo, C., et al., "Exploring Simple 3D Multi-Object Tracking for Autonomous Driving", Aug. 23, 2021, 10 pages.

Marcuzzi, R., et al., "Contrastive Instance Associated for 4D Panoptic Segmentation using Sequences of 3D LiDAR Scans", Dec. 1, 2021, 8 pages.

Marcuzzi, R., et al., "Mask-Based Panoptic LiDAR Segmentation for Autonomous Driving", Dec. 1, 2022, 8 pages.

Milioto, A., et al., "RangeNet++: Fast and Accurate LiDAR Semantic Segmentation", Nov. 3-8, 2019, 8 pages.

Milito, A., et al., "LiDAR Panoptic Segmentation for Autonomous Driving", Oct. 24, 2020, 8 pages.

(56) References Cited

OTHER PUBLICATIONS

Liang, M., "Deep Continuous Fusion for Multi-Sensor 3D Object Detection", Dec. 20, 2020, 16 pages.
Vora, S., et al., "Pointing Painting: Sequential Fusion for 3D Object Detection", May 6, 2020, 9 pages.
Wang, C., et al., "PointAugmenting: Cross-Modal Augmentation for 3D Object Detection", Jun. 20-25, 2021, 10 pages.
Xu, J., et al., "RPVNet: A Deep and Efficient Range-Point-Voxel Fusion Network for LiDAR Point Cloud Segmentation", Mar. 24, 2021, 10 pages.
Zhang, Y., et al., "PolarNet: An Improved Grid Representation for Online LiDAR Point Clouds Semantic Segmentation", Mar. 31, 2020, 10 pages.
Chang, C., et al., "Box-Aware Feature Enhancement for Single Object Tracking on Point Clouds", Aug. 10, 2021, 10 pages.
Zhou, Z., et al., "Panoptic-PolarNet: Proposal-Free LiDAR Point Cloud Panoptic Segmantation", Mar. 27, 2021, 10 pages.
Zhu, M., et al., "4D Panoptic Segmentation as Invariant and Equivariant Field Prediction", Mar. 28, 2023, 11 pages.
Zhu, X., et al., "Cylindrical and Asymmetrical 3D Convolution Networks for LiDAR Segmentation", Nov. 19, 2020, 10 pages.
Zhuang, Z., et al., "Perception-Aware Multi-Sensor Fusion for 3D LiDAR Semantic Segmentation", Oct. 10-17, 2021, 11 pages.

* cited by examiner

MULTIMODAL FOUR-DIMENSIONAL PANOPTIC SEGMENTATION

CROSS REFERENCE TO RELATED APPLICATIONS

This application claims benefit under 35 U.S.C. § 119 (e) to U.S. Patent Application Ser. No. 63/471,948 filed on Jun. 8, 2023. U.S. Patent Application Ser. No. 63/471,948 is incorporated herein by reference.

BACKGROUND

Perception systems may be employed in self-driving vehicles (SDVs) to understand the scene of a physical location both spatially and temporally. Four dimensional (4D, e.g., three spatial dimensions and one time dimension) panoptic segmentation (referred to herein as panoptic segmentation) is a task that involves assigning semantic labels to observations and instance identifiers (IDs) to unique objects consistently over time. Panoptic segmentation combines semantic segmentation, instance segmentation, and object tracking into a comprehensive task. Potential applications of panoptic segmentation include building semantic maps, auto-labelling object trajectories, and onboard perception. Panoptic segmentation is challenging due to the sparsity of data in point cloud observations, and the computational complexity of four dimensional spatial temporal reasoning.

Constituent tasks for panoptic segmentation may be handled in isolation, e.g., segmenting classes, identifying individual objects, and tracking the objects over time may be performed independently with multiple networks that may include multiple machine learning models. However, combining multiple networks into a single perception system makes the combined system error-prone, potentially slow, and cumbersome to train. End-to-end approaches for panoptic segmentation have emerged, but may be limited to using light detection and ranging (LiDAR) data that provides accurate three dimensional (3D) geometry, which is sparse at range and lacks visual appearance information that may be used to disambiguate certain classes (e.g., a pedestrian might look like a pole at range). Additionally, combining LiDAR and camera data effectively and efficiently is non-trivial as the observations are very different in nature.

SUMMARY

In general, in one or more aspects, the disclosure relates to a method implementing multimodal four-dimensional panoptic segmentation. The method includes receiving a set of images and a set of point clouds and executing an image encoder model using the set of images to extract a set of image feature maps. The method further includes executing a point voxel encoder model using the set of image feature maps and the set of point clouds to extract a set of voxel features, a set of image features, and a set of point features and executing a panoptic decoder model using the set of voxel features, the set of image features, the set of point features, and a set of queries to generate a semantic mask and a track mask. The method further includes performing an action responsive to at least one of the semantic mask and the track mask.

In general, in one or more aspects, the disclosure relates to a system that may include at least one processor and a non-transitory computer readable medium for causing the at least one processor to perform operations implementing multimodal four-dimensional panoptic segmentation. The operations may perform operations that include receiving a set of images and a set of point clouds and executing an image encoder model using the set of images to extract a set of image feature maps. The operations may perform operations that include executing a point voxel encoder model using the set of image feature maps and the set of point clouds to extract a set of voxel features, a set of image features, and a set of point features and executing a panoptic decoder model using the set of voxel features, the set of image features, the set of point features, and a set of queries to generate a semantic mask and a track mask. The operations may perform operations that include performing an action responsive to at least one of the semantic mask and the track mask.

In general, in one or more aspects, the disclosure relates to a non-transitory computer readable medium that includes instructions executable by at least one processor to implement multimodal four-dimensional panoptic segmentation. Execution of the instructions may perform receiving a set of images and a set of point clouds and executing an image encoder model using the set of images to extract a set of image feature maps. Execution of the instructions may perform executing a point voxel encoder model using the set of image feature maps and the set of point clouds to extract a set of voxel features, a set of image features, and a set of point features and executing a panoptic decoder model using the set of voxel features, the set of image features, the set of point features, and a set of queries to generate a semantic mask and a track mask. Execution of the instructions may perform performing an action responsive to at least one of the semantic mask and the track mask.

Other aspects of one or more embodiments may be apparent from the following description and the appended claims.

BRIEF DESCRIPTION OF DRAWINGS

Similar elements in the various figures may be denoted by similar names and reference numerals. The features and elements described in one figure may extend to similarly named features and elements in different figures.

DETAILED DESCRIPTION

In general, embodiments of the disclosure perform multimodal four dimensional panoptic segmentation. The segmentation may be performed using multiple machine learning models that operate in conjunction to process images and point clouds to generate semantic and track masks. The semantic masks identify the types of objects within a scene and the track masks track the objects within a scene. In an embodiment, image feature maps are extracted from images and voxel features, image features, and point features are extracted from the image feature maps and point clouds. The voxel features, image features, and point features are processed to generate the semantic masks and track masks.

Embodiments of the disclosure provide an approach for 4D panoptic segmentation that fuses information from LiDAR (point cloud data) and from cameras (image data) to output high quality semantic segmentation labels as well as temporally consistent object masks for the input point cloud sequence. With this approach, embodiments of the disclosure provide multi-sensor fusion for 4D panoptic point cloud segmentation. Embodiments of the disclosure provide panoptic segmentation using a transformer-based architecture that fuses features from both modalities (point cloud data and image data) by efficiently encoding object instances and semantic classes as concise queries within the transformer architecture. A learned tracking framework is used that maintains a history of previously observed object tracks to overcome occlusions without hand-crafted heuristics. The concepts disclosed herein provide an elegant way to reason in space and time about all the tasks that constitute 4D panoptic segmentation.

Figure 1:
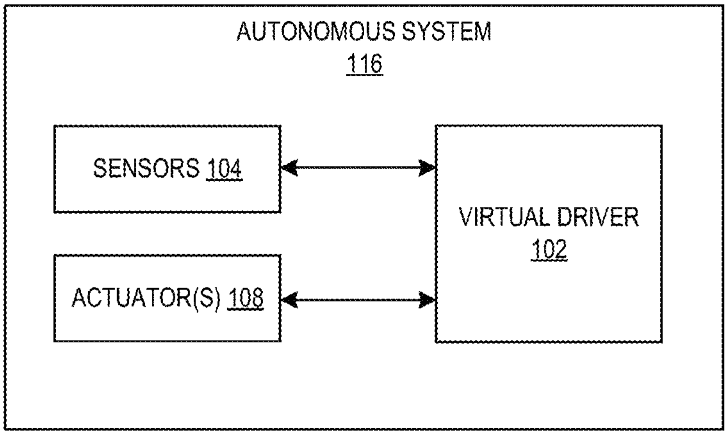
FIG. 1, FIG. 2, and FIG. 3 show diagrams of an autonomous training and testing system in accordance with one or more embodiments.
Figure 2:
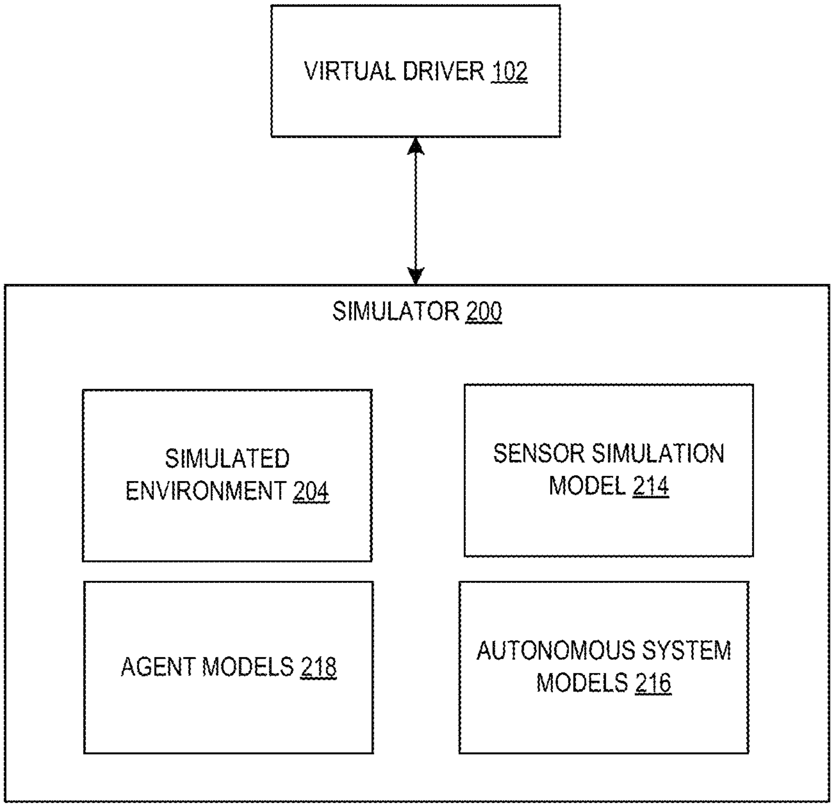

Turning to the Figures, FIG. 1 and FIG. 2 show example diagrams of the autonomous system and virtual driver. Turning to FIG. 1, an autonomous system (116) is a self-driving mode of transportation that does not require a human pilot or human driver to move and react to the real-world environment. The autonomous system (116) may be completely autonomous or semi-autonomous. As a mode of transportation, the autonomous system (116) is contained in a housing configured to move through a real-world environment. Examples of autonomous systems include self-driving vehicles (e.g., self-driving trucks and cars), drones, airplanes, robots, etc.

The autonomous system (116) includes a virtual driver (102) that is the decision making portion of the autonomous system (116). The virtual driver (102) is an artificial intelligence system that learns how to interact in the real world and interacts accordingly. The virtual driver (102) is the software executing on a processor that makes decisions and causes the autonomous system (116) to interact with the real world including moving, signaling, and stopping or maintaining a current state. Specifically, the virtual driver (102) is decision making software that executes on hardware (not shown). The hardware may include a hardware processor, memory or other storage device, and one or more interfaces. A hardware processor is any hardware processing unit that is configured to process computer readable program code and perform the operations set forth in the computer readable program code.

A real world environment is the portion of the real world through which the autonomous system (116), when trained, is designed to move. Thus, the real world environment may include concrete and land, construction, and other objects in a geographic region along with agents. The agents are the other agents in the real world environment that are capable of moving through the real world environment. Agents may have independent decision making functionality. The independent decision making functionality of the agent may dictate how the agent moves through the environment and may be based on visual or tactile cues from the real world environment. For example, agents may include other autonomous and non-autonomous transportation systems (e.g., other vehicles, bicyclists, robots), pedestrians, animals, etc.

In the real world, the geographic region is an actual region within the real world that surrounds the autonomous system. Namely, from the perspective of the virtual driver, the geographic region is the region through which the autonomous system moves. The geographic region includes agents and map elements that are located in the real world. Namely, the agents and map elements each have a physical location in the geographic region that denotes a place in which the corresponding agent or map element is located. The map elements are stationary in the geographic region, whereas the agents may be stationary or nonstationary in the geographic region. The map elements are the elements shown in a map (e.g., road map, traffic map, etc.) or derived from a map of the geographic region.

The real world environment changes as the autonomous system (116) moves through the real world environment. For example, the geographic region may change and the agents may move positions, including new agents being added and existing agents leaving.

In order to interact with the real-world environment, the autonomous system (116) includes various types of sensors (104), such as LiDAR sensors amongst other types, which are used to obtain measurements of the real-world environment, and cameras that capture images from the real world environment. The autonomous system (116) may include other types of sensors as well. The sensors (104) provide input to the virtual driver (102).

In addition to sensors (104), the autonomous system (116) includes one or more actuators (108). An actuator is hardware and/or software that is configured to control one or more physical parts of the autonomous system based on a control signal from the virtual driver (102). In one or more embodiments, the control signal specifies an action for the autonomous system (e.g., turn on the blinker, apply brakes by a defined amount, apply accelerator by a defined amount, turn the steering wheel or tires by a defined amount, etc.). The actuator(s) (108) are configured to implement the action. In one or more embodiments, the control signal may specify a new state of the autonomous system and the actuator may be configured to implement the new state to cause the autonomous system to be in the new state. For example, the control signal may specify that the autonomous system should turn by a certain amount while accelerating at a predefined rate, while the actuator determines and causes the wheel movements and the amount of acceleration on the accelerator to achieve a certain amount of turn and acceleration rate.

The testing and training of the virtual driver (102) of the autonomous systems in the real-world environment may be unsafe because of the accidents that an untrained virtual driver can cause. Thus, as shown in FIG. 2, a simulator (200) is configured to train and test a virtual driver (102) of an autonomous system. For example, the simulator may be a unified, modular, mixed-reality, closed-loop simulator for autonomous systems. The simulator (200) is a configurable simulation framework that enables not only evaluation of different autonomy components of the virtual driver (102) in isolation, but also as a complete system in a closed-loop manner. The simulator reconstructs "digital twins" of real world scenarios automatically, enabling accurate evaluation of the virtual driver at scale. The simulator (200) creates the simulated environment (204) which is a virtual world in which the virtual driver (102) is a player in the virtual world. The simulated environment (204) is a simulation of a real-world environment, which may or may not be in actual existence, in which the autonomous system is designed to move. As such, the simulated environment (204) includes a simulation of the objects (i.e., simulated objects or agents) and background in the real world, including the natural objects, construction, buildings and roads, obstacles, as well as other autonomous and non-autonomous objects. The simulated environment simulates the environmental conditions within which the autonomous system may be deployed. The simulated objects may include both stationary and non-stationary objects. Non-stationary objects are agents in the real-world environment.

In the simulated environment, the geographic region is a realistic representation of a real-world region that may or may not be in actual existence. Namely, from the perspective of the virtual driver, the geographic region appears the same as if the geographic region were in existence if the geographic region does not actually exist, or the same as the actual geographic region present in the real world. The geographic region in the simulated environment includes virtual agents and virtual map elements that would be actual agents and actual map elements in the real world. Namely, the virtual agents and virtual map elements each have a physical location in the geographic region that denotes an exact spot or place in which the corresponding agent or map element is located. The map elements are stationary in the geographic region, whereas the agents may be stationary or nonstationary in the geographic region. As with the real world, a map exists of the geographic region that specifies the physical locations of the map elements.

The simulator (200) includes an autonomous system model (216), sensor simulation models (214), and agent models (218). The autonomous system model (216) is a detailed model of the autonomous system in which the virtual driver (102) will execute. The autonomous system model (216) includes model, geometry, physical parameters (e.g., mass distribution, points of significance), engine parameters, sensor locations and type, firing pattern of the sensors, information about the hardware on which the virtual driver executes (e.g., processor power, amount of memory, and other hardware information), and other information about the autonomous system. The various parameters of the autonomous system model may be configurable by the user or another system.

The autonomous system model (216) includes an autonomous system dynamic model. The autonomous system dynamic model is used for dynamics simulation that takes the actuation actions of the virtual driver (e.g., steering angle, desired acceleration) and enacts the actuation actions on the autonomous system in the simulated environment to update the simulated environment and the state of the autonomous system. The interface between the virtual driver (102) and the simulator (200) may match the interface between the virtual driver (102) and the autonomous system in the real world. Thus, to the virtual driver (102), the simulator simulates the experience of the virtual driver within the autonomous system in the real world.

In one or more embodiments, the sensor simulation model (214) models, in the simulated environment, active and passive sensor inputs. The sensor simulation models (114) are configured to simulate the sensor observations of the surrounding scene in the simulated environment (204) at each time step according to the sensor configuration on the vehicle platform. Passive sensor inputs capture the visual appearance of the simulated environment including stationary and nonstationary simulated objects from the perspective of one or more cameras based on the simulated position of the camera(s) within the simulated environment. Examples of passive sensor inputs include inertial measurement unit (IMU) and thermal. Active sensor inputs are inputs to the virtual driver of the autonomous system from the active sensors, such as LiDAR, RADAR, global positioning system (GPS), ultrasound, etc. Namely, the active sensor inputs include the measurements taken by the sensors, and the measurements being simulated based on the simulated environment based on the simulated position of the sensor(s) within the simulated environment.

Agent models (218) represents an agent in a scenario. An agent is a sentient being that has an independent decision making process. Namely, in a real world, the agent may be an animate being (e.g., person or animal) that makes a decision based on an environment. The agent makes active movement rather than or in addition to passive movement. An agent model, or an instance of an actor model may exist for each agent in a scenario. The agent model is a model of the agent. If the agent is in a mode of transportation, then the agent model includes the model of transportation in which the agent is located. For example, actor models may represent pedestrians, children, vehicles being driven by drivers, pets, bicycles, and other types of actors.

Figure 3:
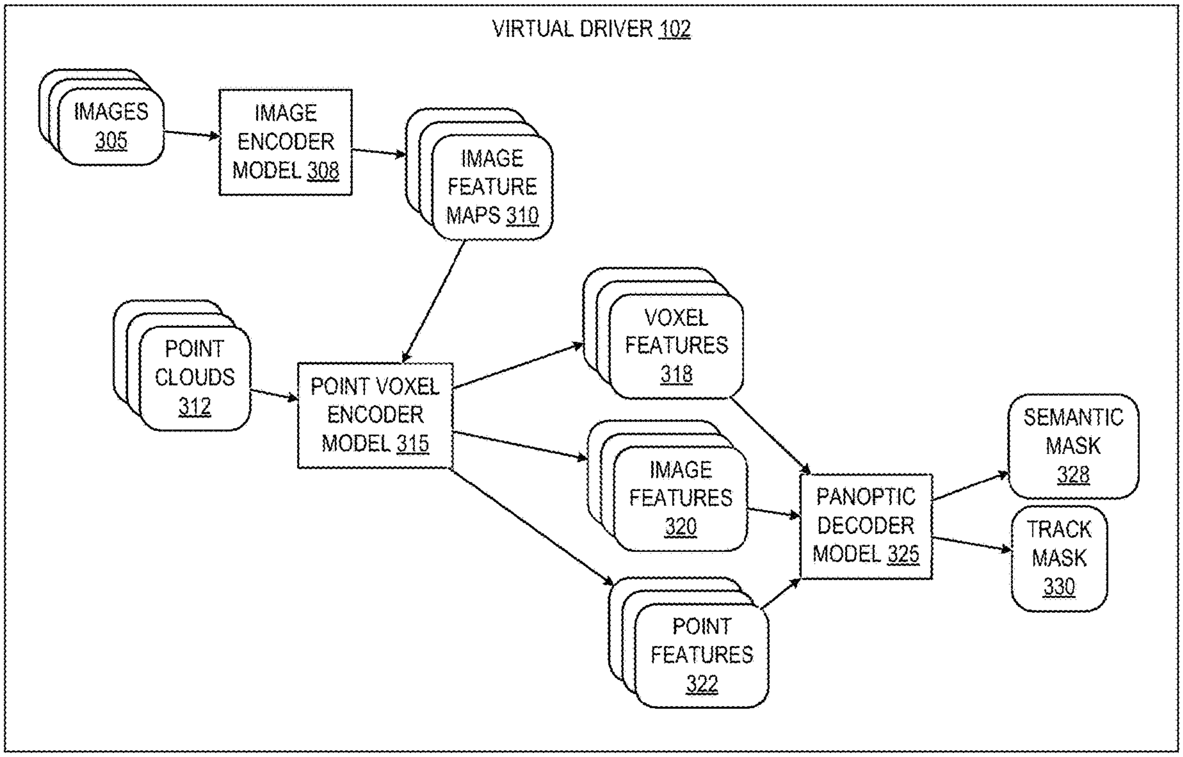

Turning to FIG. 3, an embodiment of the virtual driver (102) is described with additional detail. The virtual driver (102) processes the images (305) and the point clouds (312) to generate the semantic mask (328) and the track mask (330). The processing of the images (305) and the point clouds to generate the semantic mask (328) and the track mask (330) is performed using multiple machine learning models, including the image encoder model (308), the point voxel encoder model (315), and the panoptic decoder model (325).

The machine learning models used by the system may include neural networks and may operate using one or more layers of weights that are sequentially applied to sets of input data, referred to as input vectors. For each layer of a machine learning model, the weights of the layer may be multiplied by the input vector to generate a collection of products, which may then be summed to generate an output for the layer that may be fed, as input data, to a next layer within the machine learning model. The output of the machine learning model may be the output generated from the last layer within the machine learning model. The output may be a vector or scalar value. The layers within the machine learning model may be different and correspond to different types of models. As an example, the layers may include layers for recurrent neural networks, convolutional neural networks, transformer models, attention layers, perceptron models, etc. Perceptron models may include one or more fully connected (also referred to as linear) layers that may convert between the different dimensions used by the inputs and the outputs of a model. The machine learning model may be trained by inputting training data to the machine learning model to generate training outputs that are compared to expected outputs. For supervised training the expected outputs may be labels associated with a given input. For unsupervised learning, the expected outputs may be previous outputs from the machine learning model. The difference between the training output and the expected output may be processed with a loss function to identify updates to the weights of the layers of the model. After training on a batch of inputs, the updates identified by the loss function may be applied to the machine learning model to generate a trained machine learning model. Different algorithms may be used to calculate and apply the updates to the machine learning model, including back propagation, gradient descent, etc.

The images (305) are collections of data. The images (305) may be captured with one or more camera systems that provide a panoptic view of a physical scene. The images (305) may be captured from different viewpoints to provide relevant information about the scene. For example, the panoptic camera system may include a set of cameras disposed in a circular manner to provide a 360 degree field of view of the physical scene. In an embodiment, the number of images for each time step may correspond to the number of cameras in the system. As an example, a system with six cameras may provide six images at each time step. Each of the images (305) may be a two dimensional array of numerical values representing pixel intensities of an image. The images (305) may have a single intensity per image (grey scale) or multiple channels for each image (red, green, blue, etc.). The images (305) are input to the image encoder model (308).

The image encoder model (308) is a collection of programs that processes image data to identify features within the image data. The image encoder model (308) processes the images (305) to generate the image feature maps (310). The image encoder model (308) may use multiple types of machine learning models to extract the image feature maps (310) from the images (305). For example, the image encoder model (308) may include a residual network that includes multiple convolutional layers and skip layers to generate features from the images (305) stored as vectors which may have different dimensions than the dimensions of the images (305). Further, the output of the residual network may be processed with a feature pyramid network that creates a feature pyramid that includes multiple feature maps at different spatial resolutions, that form the image feature maps (310).

In an embodiment, one set of the feature maps (310) generated for one set of the images (305) for one time step may include multiple resolutions. For example, the set of image feature maps may include a resolution that is one-fourth of the resolution of the images (305) and include another feature map that has one-eighth the resolution of the images (305).

The image feature maps (310) are collections of data that contain features identified from the images (305). The image feature maps (310) may have resolutions that are different from the resolutions used by the images (305). The image feature maps (310) may be input to the point voxel encoder model (315).

The point clouds (312) are collections of data that identify the locations of objects in a physical space. In an embodiment, each point of one of the point clouds includes location information and intensity information. In an embodiment, the sensor data, from which the point clouds (312) are generated, is converted to three dimensional values that identify the location of a point that corresponds to an object in the physical space measured by the sensor system. For example, the location information and the intensity information may be structured as a four element vector with x, y, and z coordinate values and an intensity value. Additionally, a timestamp may be included to identify when a point cloud is generated. In an embodiment, a point cloud may be generated by a light detection and ranging (LiDAR) system that scans the physical space to generate a point cloud. A point cloud may be generated for each moment or step of time and associated with a timestamp (which may be included in the vector for a point or the data structure for a point cloud). A point cloud may be generated by one or more sensor systems at each time step and included within the point clouds (312). A frame of data may include the point clouds generated by one or more sensor systems at a moment in time. A frame of data, including one or more of the point clouds (312), may be input to the point voxel encoder model (315). In an embodiment, the point clouds (312) may include point clouds for multiple time steps. In an embodiment, the time steps for the point clouds (312) may be near or surrounding the time stamp for the images (305).

The point voxel encoder model (315) is a collection of programs that processes point cloud data to identify features within the point cloud data. The point voxel encoder model (315) processes the point clouds (312) and the image feature maps (310) to generate the voxel features (318), the image features (320), and the point features (322). The point voxel encoder model (315) may use multiple algorithms, models, transformations, etc., to generate the voxel features (318), the image features (320), and the point features (322) from the point clouds (312) and the image feature maps (310). In an embodiment, the point voxel encoder model (315) may include multiple perceptron models, convolutional models, deconvolutional models (i.e., inverse convolutional models). In an embodiment, the voxel features (318) may be intermediate outputs from the deconvolutional models within the point voxel encoder model (315) and the point features (322) may be the output of the point voxel encoder model (315) after processing by the perceptron models, the convolutional models, and the deconvolutional models of the point voxel encoder model (315). In an embodiment, the image features (320) may be generated by the point voxel encoder model (315) by combining the voxel features (318) with the image feature maps (310).

The voxel features (318) are collections of data that contain features identified from the point clouds (312) and the images (305) and organized by voxels. A voxel (which may stand for "volume element" or "volume pixel") is a three dimensional counterpart of a pixel for a two dimensional image. Each voxel may represent a volume of three dimensional space to form a grid of volume metric elements. In an embodiment, a voxel may represent a 0.1 meter cube volume of space which may be identified as $V_1$. Multiple voxel sizes corresponding to different spatial resolutions may be used. Each voxel in a three dimensional grid of voxels may have a feature vector to identify features associated with the voxel. The voxel features (318) are generated by the point voxel encoder model (315) from the point clouds (312) and the image feature maps (310) and may be used as an input to the panoptic decoder model (325).

The image features (320) are collections of data with features organized according to one or more image spaces. In an embodiment, the image features (320) are generated by projecting the features from the voxel features (318) to the image feature maps (310). A set of the image features (320) may be generated for each set of the voxel features (318) and each set of the image feature maps (310).

The point features (322) are collections of data that contain features identified from the point clouds (312) and the images (305) which may be organized by point. Each point from the point clouds (312) may be associated with a vector of features to form the point features (322). The point features (322) may be input to the panoptic decoder model (325).

The panoptic decoder model (325) is a collection of programs that processes features to identify objects in a scene semantically and numerically. The panoptic decoder model (325) processes the voxel features (318), the image features (320), and the point features (322) to generate the semantic mask (328) and the track mask (330). The panoptic decoder model (325) may use multiple models, techniques, and transformations to generate the semantic mask (328) and the track mask (330) from the voxel features (318), the image features (320), and the point features (322). In an embodiment, the panoptic decoder model (325) uses a transformer model to process a set of queries that correspond to objects that may be identified from the scene captured with the images (305) and the point clouds (312). The transformer model processes the queries using cross-attention with the voxel features (318) and cross-attention with the image features (320) to generate an updated set of queries that correspond to the objects in the scene. The output of the transformer model may be processed with a perceptron model to generate a set of semantic masks that include the semantic mask (328). The output of the transformer model and the updated queries may be combined with the point features (322) to generate a set of tracklet masks from which a set of track masks, which include the track mask (330), may be generated. The tracklet masks include object identifiers that identify the different unique objects within the temporal portion of the scene being processed, i.e., in a current iteration. The temporal portion may be between the first time stamp and the last time stamp for the point clouds (312) that are being processed for one time step. The track masks provide object identifiers that uniquely identify the different objects in a scene over multiple time steps. The panoptic decoder model (325) processes the tracklet masks with previously generated track masks to generate the track mask (330) to include object identifiers that are correlated with previously identified objects within previously generated track masks.

The semantic mask (328) is collection of data that contains semantic identifiers for the objects in a scene organized by the points from the point clouds (312). In an embodiment, the semantic mask (328) includes a semantic identifier for each point from one of the point clouds (312) to identify the type of object located at the point in the point cloud. In an embodiment, the semantic identifier may be an integer that is coded to different types of objects. The different types of objects may include ground, street, person, car, truck, train, etc.

The track mask (330) is a collection of data that contains an object identifier that distinguishes different objects in a scene over multiple time steps. The object identifier may be an integer value coded to identify different objects. As an example, the first object identified in a scene may be given the integer value "one", the next object identified within a scene may be given the value "two", and so on. The same object between different time steps or iterations should have the same object identifier.

Figure 4:
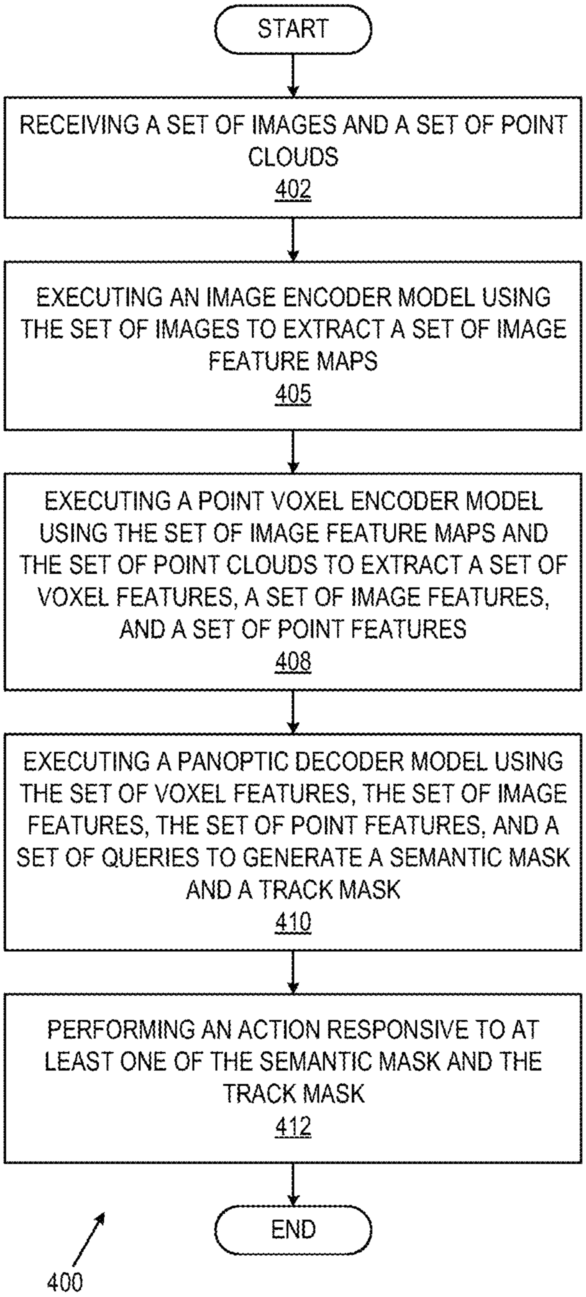
FIG. 4 shows a flowchart of the autonomous training and testing system in accordance with one or more embodiments.

Turning to FIG. 4, the process (400) may be part of a practical application to implement multimodal four dimensional panoptic segmentation. The method of FIG. 4 may be implemented using the systems described in the other figures, and one or more of the steps may be performed on, or received at, one or more computer processors. In an embodiment, a system may include at least one processor and an application that, when executing on the at least one processor, performs the method. In an embodiment, a non-transitory computer readable medium may include instructions that, when executed by one or more processors, perform the method. The outputs from various components (including models, functions, procedures, programs, processors, etc.) performing the method may be generated by executing one or more transformations to inputs using the components to create the outputs without using mental processes or human activities. The process (400) may include multiple steps (e.g., steps 402 through 412) that may execute on the components described in the other figures.

Step 402 includes receiving a set of images and a set of point clouds. The images may be received from a set of real or simulated sensors for multiple camera systems. In an embodiment, the cameras may be placed around an autonomous system to provide a 360 degree view around the autonomous system. The point clouds may be received from real or simulated sensors that may include one or more LiDAR systems installed to an autonomous system.

In an embodiment, the process (400) includes matching the set of images to the set of point clouds using a timestamp associated with the set of images and the set of point clouds. The set of images comprises a timestamp corresponding to the set of point clouds. The sets of point clouds and the corresponding set of images may be captured at different times. For example, one point cloud of the set of point clouds may be captured prior to capture of the set of images and another point cloud of the set of point clouds may be captured after capture of the set of images. In an embodiment, the camera systems capturing the images of the set of images may be synchronized to capture the images at substantially the same time. The system may identify a collection of point clouds captured by the LiDAR system that are nearest to the time of capture of the images captured by the camera system to use when processing the images to generate the semantic and track masks.

Step 405 includes executing an image encoder model using the set of images to extract a set of image feature maps. The image encoder model may perform multiple transformations that change the values and dimensionality of the input (images) to that of the output (image feature maps).

In an embodiment, executing the image encoder model includes executing a residual network using the set of images to generate a set of intermediate features. The residual network may be a neural network that includes convolutional layers and skip layers, which may be grouped into residual network blocks. Each residual network block of the residual network may include one or more convolutional layers that sequentially process the input to the residual network block with a skip layer that passes the input to the residual network block through to the output of the residual network block, which may be combined with the output of the convolutional layers. In an embodiment, a convolutional layer may be part of a convolutional neural network and reduce a spatial resolution of an input image. The spatial resolution may be reduced by applying filters with strides and pooling, which condense the information into smaller dimensions. Simultaneously, the filters with strides and pooling may increase the number of features by using multiple filters that capture different aspects of the input data, to generate a richer, more detailed representation of the objects in a scene.

In an embodiment, executing the image encoder model further includes executing a feature pyramid network (FPN) using the intermediate features to generate the set of image feature maps. The feature pyramid network process inputs to generate rich image feature maps at multiple scales as outputs. The feature pyramid network may utilize a top-down architecture with lateral connections to build high-level semantic feature maps at different scales from a single input. The feature maps may be combined in a top-down manner with the highest-resolution feature map being up sampled and merged with the feature map from the previous layer using lateral connections. The combination process may be repeated iteratively, to construct feature maps that incorporate both high-level semantic information and fine-grained spatial details as multi-scale image feature maps that are output from the feature pyramid network. In an embodiment, the image feature maps may include two image feature maps for each input image in which the image feature maps have resolutions of one fourth and one eighth of the original input. Other resolutions may be used.

Step 408 includes executing a point voxel encoder model using the set of image feature maps and the set of point clouds to extract a set of voxel features, a set of image features, and a set of point features. In an embodiment, executing the point voxel encoder model includes executing one or more perceptron models and one or more convolutional models using the set of point clouds to generate the set of voxel features and the set of point features. Additionally, the point features generated from processing the point clouds may be combined (i.e., point level fused) with image features generated from processing the images. Multiple layers of convolutions, perceptrons, and point level fusions may be performed to generate the outputs of the point voxel encoder model. The voxel features may be intermediate outputs from one or more of the convolutional (or deconvolutional) layers. A deconvolutional layer may operate inversely from a convolutional layer. A deconvolutional layer is a convolutional layer that may use filters with strides and pooling to increase the spatial resolution and reduce the number of features for the output of the layer as compared to the input.

In an embodiment, a projection model is executed using the set of voxel features to generate the set of image features. The projection model combines the voxel features with the image feature maps to generate the image features. In an embodiment, the voxel features (in a three dimensional voxel space) are projected into the space (multiple two dimensional spaces) of the image feature maps to generate the image features. A set of image features may be generated for each set of voxel features. The voxel features generated by the point voxel encoder model may include multiple sets that have different resolutions. For example, the sets of voxel features may include a set for an original scale (e.g., $0.1^3$ cubic meters per voxel, $V_1$), half scale (e.g., $0.2^3$ cubic meters per voxel, $V_2$), quarter scale (e.g., $0.4^3$ cubic meters per voxel, $V_4$), and eighth scale (e.g., $0.8^3$ cubic meters per voxel, $V_8$). Different scales may be used. Each set of image features may include features for each set of image feature maps. For example, the image feature maps may include quarter scale ($I_4$) and eighth scale ($I_8$) image feature maps so that each set of image features may also include features from the quarter scale and eighth scale image feature maps.

Step 410 includes executing a panoptic decoder model using the voxel features, the image features, the point features, and a set of queries to generate a semantic mask and track mask. In an embodiment, the panoptic decoder model includes a transformer model to process the voxel features, the image features, the point features, and the set of queries to generate a semantic mask and track mask. The queries of the set of queries that are processed by the transformer model may represent the objects that may be identified in the scene captured with the images and point clouds by the system. Each query of the set of queries processed by the transformer model of the panoptic decoder model may be analogous to a token or word processed by a transformer model of a language model.

In an embodiment, executing the panoptic decoder model includes executing a set of fusion blocks corresponding to a plurality of sets of voxel features (which include the set of voxel features), and to a plurality of sets of image features (which include the set of image features). The fusion blocks of the transformer model of the panoptic decoder model may be akin to the layers of a transformer model of a language model. The number of fusion blocks may correspond to the number of sets of voxel (and image) features generated by the point voxel encoder model. For example, when the sets of voxel features includes sets for initial, half, quarter, and eighth scales (i.e., four different scales), the transformer model of the panoptic decoder model may include four fusion blocks. Different numbers of fusion blocks may be used.

In an embodiment, executing the panoptic decoder model further includes executing a fusion block, of the set of fusion blocks, using a set of queries, a self-attention layer, a cross-attention layer with the set of voxel features, and a cross-attention layer with the set of image features, to generate a set of updated queries. As an example, the input to a fusion block is a set of queries, a set of voxel features, a set of image features and the output may be an updated set of queries. The input queries may be combined with a set of voxel features (at one scale) using a cross-attention layer to generate intermediate features. The intermediate features may be processed and combined with the image features (at the same scale as the voxel features) using a second cross-attention layer within the fusion block. Self-attention layers may be applied to the outputs of the cross-attention layers. The output of the last fusion block may form the set of updated queries that are output from the panoptic decoder model.

In an embodiment, the process (400) includes executing a track association model using a set of tracklet masks, generated from a set of updated queries combined with the point features to generate a set of track masks (which include the track mask). In an embodiment, the track association model may be part of and executed by the panoptic decoder model. In an embodiment, the set of updated queries may be combined with the point features using the dot product mathematical transformation.

In an embodiment, {claim 8} the process (400) includes executing a semantic mask model, which includes a perceptron model, using a set of updated queries from the panoptic decoder model and the point features to generate the semantic mask. In an embodiment, the semantic mask model may be part of and executed by the panoptic decoder model. The perceptron model of the semantic mask model may include multiple fully connected layers, for example, the perceptron model may include three layers.

Step 412 includes performing an action responsive to at least one of the semantic mask and the track mask. The action performed may present information, may update the course of a vehicle, etc.

In an embodiment, performing the action includes presenting information from one or more of the semantic mask and the track mask projected onto an image of the set of images. For example, the semantic mask may be projected onto one of the initial images processed with the image encoder model. The projection of the semantic mask may be overlaid onto the initial image and displayed to a user to show the semantic classifications of the objects in the scene captured by the system.

In an embodiment, performing the action includes updating a course of an autonomous system using one or more of the semantic mask and the track mask. A virtual driver may identify that the course of the autonomous system being controlled by the autonomous system may intersect with an object identified in the semantic and track masks (e.g., another vehicle). In response, the virtual driver may take corrective action to adjust the course of the autonomous system to prevent a collision with the other vehicle.

Figure 5:
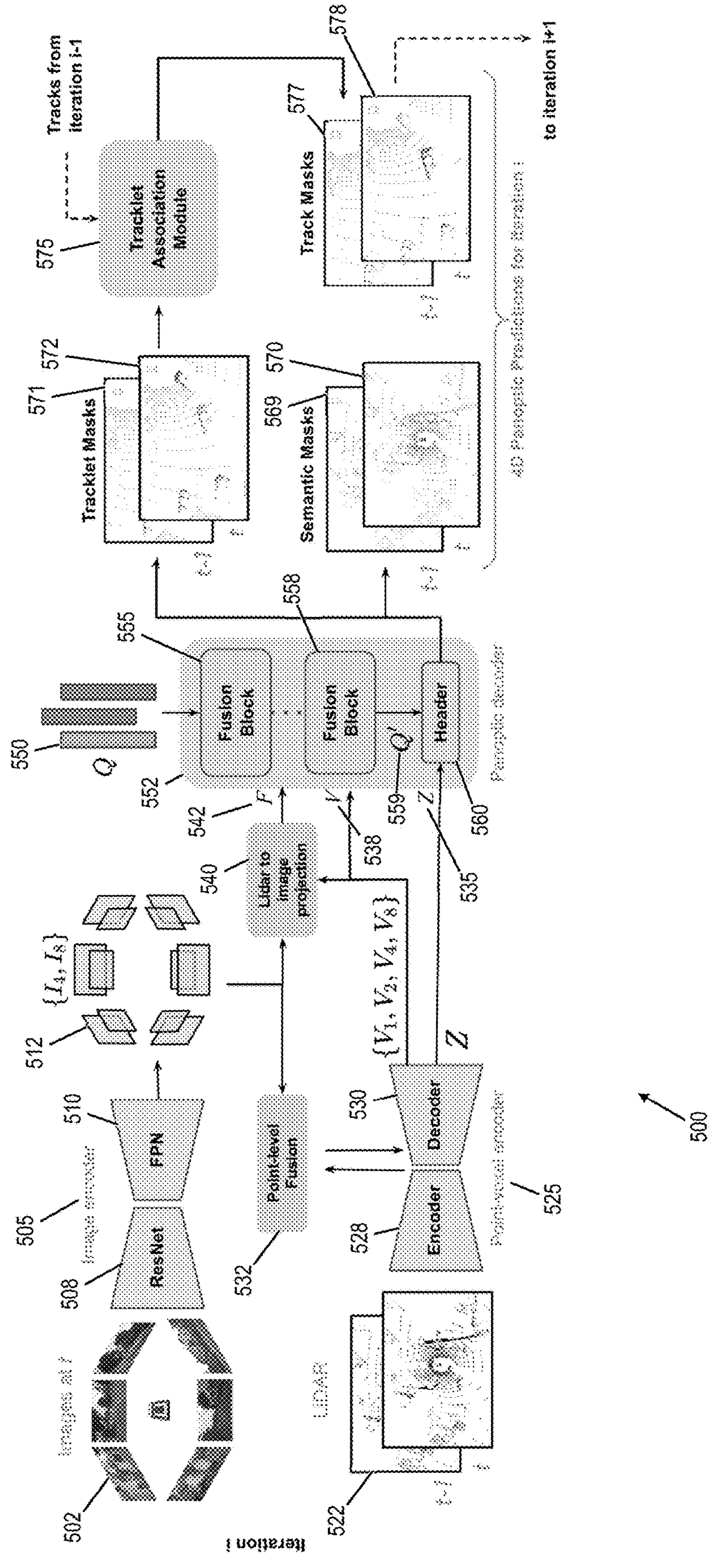
FIG. 5, FIG. 6, FIG. 7, FIG. 8, FIG. 9, and FIG. 10 show examples in accordance with one or more embodiments of the disclosure.

Turning to FIG. 5, the system (500) includes multiple machine learning models to process the images (522) to generate the semantic masks (570) and the track masks (578). The system includes the image encoder model (505) and the point voxel encoder model (525), and the panoptic decoder model (560).

The set of images (502) are images captured by sensors of the autonomous system at a point in time (t). In an embodiment, the set of images (502) includes six images that form a panoramic optical view of the scene around the autonomous system. In an embodiment, the images of the set of images may be grayscale images. Different embodiments may utilize different numbers of images and different channels of color captured by the autonomous system. The set of images (502) may be input to the residual network model (508) of the image encoder model (505).

The image encoder model (505) processes the set of images (502) to generate the set of image feature maps (512). The image encoder model (505) includes the residual network model (508) and the feature pyramid network (510) to process the set of images (502) and generate the image feature maps (512).

The residual network model (508) is a machine learning model that receives the set of images (502) and generates intermediate vectors as output, which are input to the feature pyramid network model (510). The residual network model may include multiple convolutional layers and skip layers. The residual network model (508) may reduce the resolution from that of the original images of the set of images (502) and, for each pixel, generate a vector of features that identifies the different features that may be located at a pixel in one of the images of the set of images (502).

The feature pyramid network processes the output from the residual network model (508) to generate the image feature maps (512). In an embodiment, for one set of images, the feature pyramid network (510) generates two sets of image feature maps. The first image feature map may have a resolution that is a quarter of the resolution of an original image and the second feature map may have a resolution that is an eighth of the resolution of one of the original images. Each of the pixels for each of the feature maps may again a multidimensional vector to identify features at the location of the pixel within the image feature map. The set of image feature maps (512) may be used as inputs to the point level fusion process (532) and the image projection process (535).

The set of point clouds (522) are collections of data generated by a sensor system of the autonomous system. For example, the set of point clouds (522) may be generated by a LiDAR system. In an embodiment, the set of point clouds (522) includes a point cloud at the current time (t) and a point cloud from the previous time step (t−1). The point clouds of the set of point clouds (522) are the point clouds that correspond to the images of the set of images (502). The set of point clouds (522) are input to the encoder model (528) of the point voxel encoder model (525).

The point voxel encoder model (525) is a machine learning model that processes the set of point clouds (522) with the encoder model (528) and the decoder model (530) to generate the point features (535) and the voxel features (538). As a part of the encoder model (528) and the decoder model (530), the point voxel encoder model (525) may include the point level fusion process (532) to process the set of point clouds (522).

The encoder model (528) is a machine learning model that processes the set of point clouds (522) to generate intermediate vectors, which may then be processed by the decoder model (530). The encoder model (528) may include multiple convolutional layers as well as perceptron models to process the set of point clouds (522). Further, the encoder model (528) may utilize the point level fusion process (532) to fuse features from the set of images (502) into features for the set of point clouds (522) that are incorporated into the output of the encoder model (528).

The decoder model (530) is a machine learning model that processes the output from the encoder model (528) the intermediate vectors from the encoder model (528) to generate the voxel features (538) and the point features (535). Like the encoder model (528), the decoder model (530) may utilize the point level fusion process (532) to incorporate features from the set of images (502) into the voxel features (538) and the point features (535). The decoder model (530) may include convolutional layers and perceptron layers to generate the voxel features (538) and the point features (535). The convolutional layers of the decoder model (530) may be deconvolutional layers which may increase the resolution of the underlying data structure.

The point level fusion process (532) is a process that operates to incorporate information from the image feature maps (512) into the voxel features (538) and the point features (535). In an embodiment, the fusion may be performed using one or more perceptron layers.

The point features (535) are collections of data generated from the set of point clouds (522) by the point voxel encoder model (525). The point features (535) may be a data structure that is organized by the points from the point clouds from the set of point clouds (522). For each point, the point features (535) may include a vector of features that correspond to that point. The point features (535) may be input to the header model (560) of the panoptic decoder (552).

The voxel features (538) are collections of data generated from the set of point clouds (522) by the point voxel encoder model (525). The voxel features (538) are organized by voxels that correspond to the three dimensional locations of the points from the point clouds from the set of point clouds (522). Multiple resolutions of voxels may be generated with the point voxel encoder (525). For example, the voxel features (538) may include a set of voxels for an initial scale ($V_1$), a half scale ($V_2$), a quarter scale ($V_4$), and an eighth scale ($V_8$) of the original voxel resolution. The voxel features (538) may be input to the panoptic decoder (552) and the image projection model (540).

The image projection model (540) is a model that generates the image features (542) from the set of image feature maps (512) and from the voxel features (538). The image projection model (540) may project the voxel features (538) into the space of the image feature maps (512) to generate the image features (542). The image features (542) may be input to the panoptic decoder model (552).

The set of queries (550) is processed by the transformer model within the panoptic decoder model (560). The transformer model within the panoptic decoder model (560) includes the fusion blocks (555) through (558), which may each include multiple attention layers. The queries of the set of queries (550) are the queries used within the attention layers of the fusion blocks (555) through (558). Each of the attention layers within the fusion blocks (555) through (558) use queries, keys, and value matrices to process the inputs to those attention layers with an attention algorithm and generate outputs for those attention layers. The set of queries (550) are the queries used as the inputs to the initial attention layer for the fusion block (555). The set of queries (550) may be initialized as random values from which the set of updated queries (559) are generated. The set of updated queries (559) is the output from the last fusion block (558) within the panoptic decoder model (560). Each query of the set of updated queries (559) represent an object that may be identified from the scene captured with the set of images (502) and the set of point clouds (522)). Each query of the set of updated queries (559) (as well as of the set of queries (550)) includes a vector of features that identify the features that correspond to the object that corresponds to the query.

The panoptic decoder (552) is a machine learning model that processes the set of queries (550) with the image features (542), the voxel features (538), and the point features (535) to generate the semantic masks (570) and the tracklet mask (572). The panoptic decoder model (552) processes the set of queries (550) using the fusion blocks (555) through (558) and the image features (542) and the voxel features (538) to generate the set of updated queries (559). The set of updated queries (559) are processed with the point features (535) by the header model (560) to generate the semantic mask (570) and a tracklet mask (572).

The fusion blocks (555) through (558) may be analogous to the layers within a transformer model of a language model. Each of the fusion blocks (555) through (558) may combine information from the set of queries (550), the image features (542), and the voxel features (538) using cross-attention, self-attention, and a feed forward network to generate an output that may be an input to a subsequent fusion block or to the header model (560).

The header model (560) is a machine learning model that combines the set of updated queries (559) with the point features (535) to generate the semantic mask (570) and the tracklet mask (572). In an embodiment, the header model (560) may use a perceptron model (which may have three layers) to generate the semantic mask (570) from the set of updated queries (559) and the point features (535). In an embodiment, the header model (560) may generate the tracklet mask (572) from the set of updated queries (559) and the point features (535) by combining the set of updated queries (559) with the point features (535) using a dot product.

The semantic masks (569) and (570) are collections of data generated by the panoptic decoder model (560). The semantic mask (569) may be generated for a previous iteration or time step (i.e., at t−1) and the semantic mask (570) is generated for the current iteration of processing. For example, the semantic mask (569) may be generated with a set of images at t−1 and sets of point clouds at t−2 and t−1, whereas the semantic mask (570) is generated by the panoptic decoder model (560) from the set of images at t and the sets of point clouds at t and at t−1. The semantic mask (570) may include the same number of points as in the point cloud from the set of point clouds (522) for time t. For each point, the semantic mass (570) may include an integer value that identifies a semantic meaning of an object at the point in the semantic mass (570).

The tracklet mask (571) and (572) distinguish between the different objects identified from the set of point clouds (522) using numerical identifiers. The tracklet mask (571) may be generated by the panoptic decoder (560) for a previous iteration (t−1) and the tracklet mask (572) is generated by the panoptic decoder model (560) for the current iteration (i.e., time t). The points within the tracklet masks (571) and (572) correspond to the points within the point clouds of the set of point clouds (522). Each of the objects identified within the set of point clouds (522) is given a numerical identifier, which may be an integer value. The tracklet masks (571) and (572) are input to the tracklet association module (575).

The tracklet association module (575) processes the tracklet mask (572) to generate the track mask (578). The tracklet association module (575) processes the tracklet mask (572) to correlate the numerical identifiers from the tracklet mask (572) to the numerical identifiers for objects that have been previously identified by the system (500). The track masks (577) and (578) are collections of data that numerically identify the objects, identify by the system (500) for multiple iterations, which is in contrast to the tracklet masks (571) and (572), which numerically identify objects for a single iteration each. The track mask (578) includes points that may correspond to the points from one of the set of point clouds (572). For each point, the track mask includes an integer that provides a numerical identifier for the object to track objects during multiple iterations.

Figure 6:
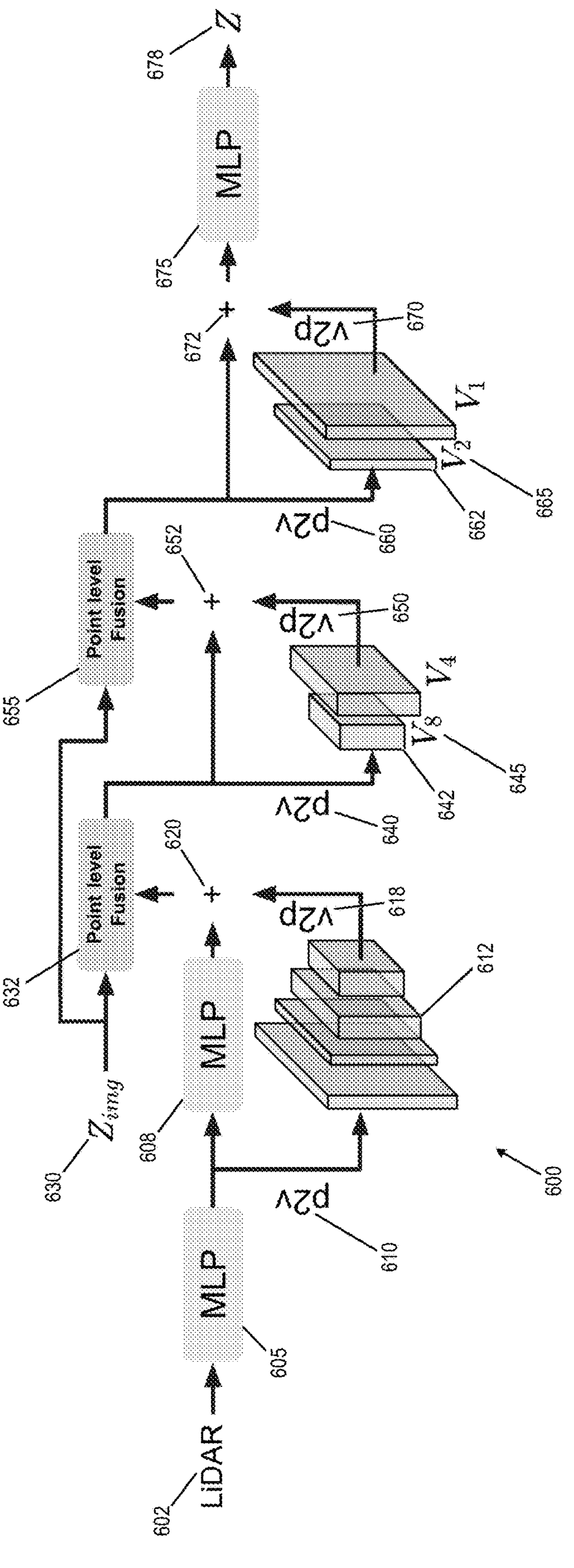

Turning to FIG. 6, the point voxel encoder model (600) processes the set of point clouds (602) from a LiDAR system to generate the point features (660). The point voxel encoder model (600) uses multiple machine learning models with multiple layers including convolutional layers, perceptron layers, combination layers, fusion layers, etc., to generate the point features (660).

The set of point clouds (602) is a collection of data that is generated by a sensor system. The set of point clouds (602) includes one or more point clouds generated from one or more sensor systems. The set of point clouds (602) is processed in a single iteration at a single time step. The set of point clouds (602) may form an input to the perceptron model (605).

The perceptron model (605) is a machine learning model that processes the set of point clouds (602) to generate point features. The output of the perceptron model (605) (the point features) are inputs to the second perceptron model (608) and to the conversion layer (610).

The perceptron model (608) is another perceptron model within the point voxel encoder model (600). The perceptron model (608) processes the output from the perceptron model (605) to further refine the features for the points of the point clouds of the set of point clouds (602). The output of the perceptron model (608) is input to the combination model (620).

The conversion layer (610) is point to voxel conversion layer. The conversion layer (610) converts features organized in the point space (i.e., the output from the perceptron model (605)) to features organized in a voxel space. In an embodiment, one voxel may correspond to multiple points and the value for the features in the voxel may be the average of the values for the features from the points that are within the voxel. The output of the conversion layer (610) is input to the convolutional model (612).

The convolutional model (612) is a convolutional neural network that processes the features in the voxel space that are output from the conversion layer (610). In an embodiment, the convolutional model (612) includes four layers that successively down sample the resolution of the voxels to output a set of voxel features, which may be input to the conversion layer (618). The conversion layer (618) converts from voxel space output by the convolutional model (612) back to the point space. The point space may correspond to the same point space, i.e., the same coordinate space as used by the point clouds of the set of point clouds (602). In an embodiment, each point within a voxel is given the same values for the features from the voxel. The output of the conversion layer (618) is input to the combination layer (620).

The combination layer (620) combines the output from the perceptron model (608) with the output from the conversion layer (618). In an embodiment, the combination is performed by summing the inputs to the combination model (620). Other types of combinations may be used, such as averaging the inputs, a weighted summation of the inputs, a weighted average of the inputs, concatenating the inputs, etc. The output of the combination model (620) is input to the point level fusion model (632).

The point features (630) are point features that have been projected into the space of an image map generated by the system. The point features that are projected may be from the output of the perceptron model (605), the output from the perceptron model (608), the output from the combination model (620). In an embodiment, the image feature map, to which the point features are projected, may be the image map generated as an output from an image encoder model. The point features (630) are input to the point level fusion model (632).

The point level fusion model (632) processes the output from the combination layer (620) with the point features (630) to fuse features from images captured by a camera system with features from point clouds captured by a LiDAR system. Point level fusion performed with the point level fusion model (632) (and (655)) enriches the geometry-based LiDAR features output from the combination model (620) with appearance-based image features by performing a fine-grained, point level feature fusion. The fusion is performed by taking the point features (referred to as $Z_{LiDAR} \in \mathbb{R}^{N \times D}$) at intermediate stages inside the LiDAR backbone, and projecting corresponding (x, y, z) coordinates to the highest resolution image feature map $I_4$. The projection may be performed since the image and LiDAR sensors that generate the image data and point cloud data are calibrated. The projection yields a set of image features (referred to as $Z_{img} \in \mathbb{R}^{M \times D}$), where M≤N since generally not all LiDAR points have valid image projections. The term $$Z_{LiDAR}^{+} \in \mathbb{R}^{M \times D}$$

denotes the subset of features in $Z_{LiDAR}$ that have valid image projections, and the term $$Z_{LiDAR}^{-} \in \mathbb{R}^{(N-M) \times D}$$

denotes the remaining terms that do not have valid image projections. Point level fusion is performed between image and LiDAR features as follows:

$$Z_{LiDAR}^{+} \leftarrow MLP_{fusion}([Z_{LiDAR}^{+}, Z_{img}]) \quad (1)$$

$$Z_{LiDAR}^{-} \leftarrow MLP_{pseudo}(Z_{LiDAR}^{-}) \quad (2)$$

where the perceptron models ($MLP_{fusion}$ and $MLP_{pseudo}$) contain three layers, and [•,] for the input to $MLP_{fusion}$ denotes channel-wise concatenation. $MLP_{fusion}$ performs pairwise fusion for corresponding image and LiDAR features. $MLP_{pseudo}$ produces an output for non-projectable LiDAR points whose feature representation matches the output of $MLP_{fusion}$ as closely as possible.

$$Z_{LiDAR}^{+}$$

and $$Z_{LiDAR}^{-}$$

are combined to form the output of the point level fusion model (632). The output of the point level fusion model (632) is input to the combination model (652) and to the conversion model (640).

The conversion model (640) converts from the point space of the output of the point level fusion model (632) to the voxel space of the convolutional model (642). The output of the conversion model is input to the convolutional model (642).

The convolutional model (642) is a machine learning model that further processes voxel features to identify objects within a scene. The convolutional model (642) may be a deconvolutional model that increases or up samples the resolution of voxels with successive layers. The outputs of the layers of the convolutional model (642) may form the set of voxel features (645) that may be used by other machine learning models (e.g., the panoptic decoder model) of the system. The output of the convolutional model (642) is input to the conversion model (650). The set of voxel features (645) are the intermediate outputs from the layers of the convolutional model (642). The set of voxel features (645) may be used in conjunction with the set of voxel features (665), from the convolutional model (662), by other models of the system.

The conversion layer (650) converts the output of the convolutional model (642) from the voxel space to the point space. The output of the conversion model (650) is input to the combination model (652).

The combination model (652) processes the output from the point level fusion model (632) and the output from the conversion model (650). The combination model (652) combines the inputs to the combination model (652) to generate an output that is input to the point level fusion model (655).

The point level fusion model (655) combines the point features (630) with the output from the combination model (652) in a similar fashion as the point level fusion model (632). The output of the point level fusion model (655) is input to the combination model (672) and to the conversion model (660).

The conversion model (660) processes the output from the point level fusion model (655). The conversion model (660) converts from the point space to the voxel space. The output from the conversion model (660) is input to the convolutional model (662).

The convolutional model (662) is a convolutional neural network model that further processes voxel features to identify objects in a scene. The convolutional model (662) may be a deconvolutional model that up samples the voxel resolution. The output of the convolutional model (662) include the voxel features (665) and is input to the conversion model (670).

The set of voxel features (665) are voxel features generated by the convolutional model (662). The set of voxel features include the intermediate outputs from the layers of the convolutional model (662).

The conversion model (670) processes output from the convolutional model (662). The conversion model (670) converts the voxel space feature vectors to feature vectors in a point space. The output from the conversion model (670) is input to the combination model (672).

The combination model (672) processes the output from the point level fusion model (655) and the output from the conversion model (670). The combination model (672) combines inputs to generate an output that is used as an input to the perceptron model (675).

The perceptron model (675) is a machine learning model that processes the output of the combination model (672) to further refine features that identify objects in a point space. The output of the perceptron model (675) is the point features (678). The point features (678) are the outputs from the perceptron model (675). The point features (678) are features that identify objects in a scene. The point features (678) may be organized as feature vectors for the points of a point space.

Figure 7:
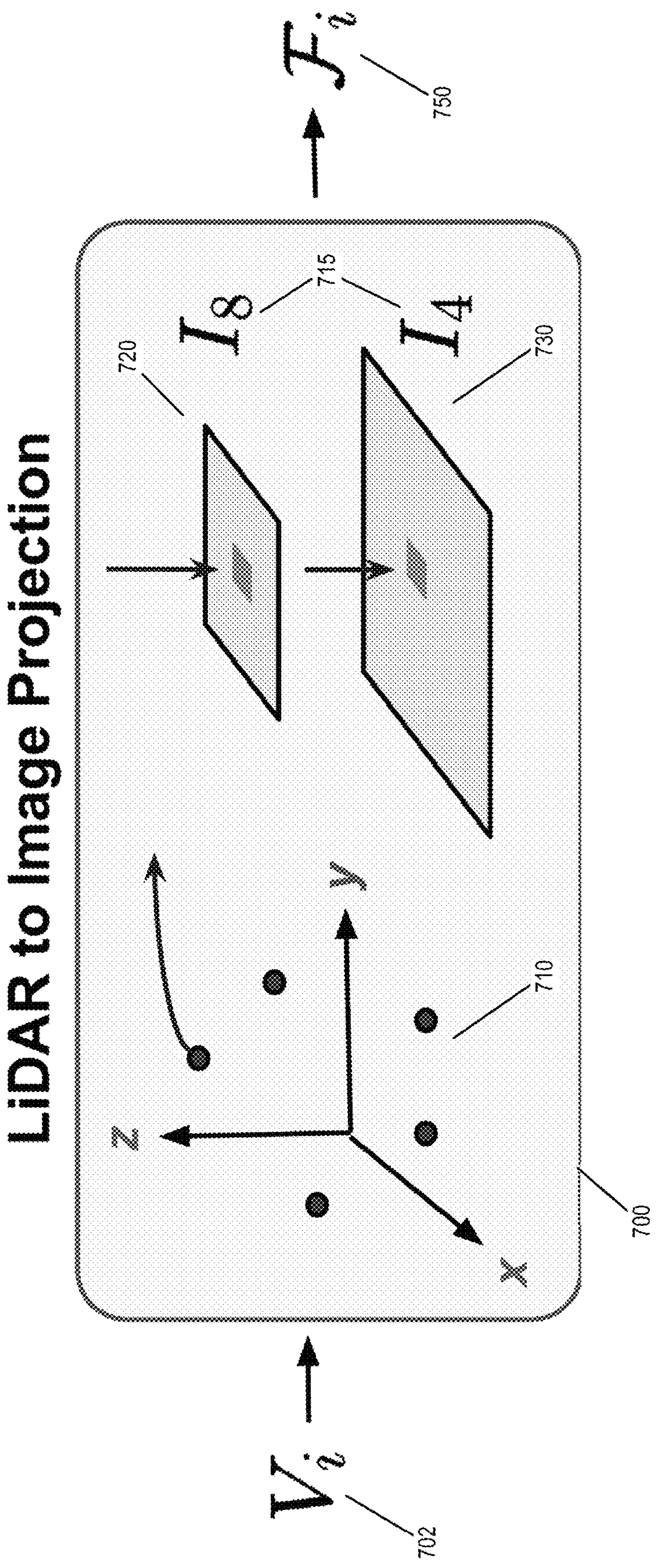

Turning to FIG. 7, the projection model (700) combines the voxel features (702) with the image feature maps (715) to form the image features (750). The projection model (700) generates the image features (750) by projecting the voxel features (702) into the set of image feature maps (715).

The voxel features (702) are collections of data. The voxel features (702) include features for each voxel in a voxel space. The voxel space (710) is a space that includes the voxels that correspond to the voxel features (702). The coordinates used to identify locations in the voxel space (710) may be different than the coordinates used to identify locations within the feature maps of the set of image feature maps (715). The voxel space (710) may be a three dimensional projection of the scene captured by the sensors of the system.

The image feature maps (715) are maps with image features generated from images captured from the scene. In an embodiment, the image feature maps (715) include a first feature map (720) and a second feature map (730), which may have different resolutions. The image feature maps (715) are two dimensional projections of the scene captured by the sensor system.

The image features (750) are features organized by the feature maps (715). The image features (750) may include a feature vector for each pixel of each feature map. The feature vectors in the image features combine feature vectors from the image feature maps (715) and the voxel features (702).

Figure 8:
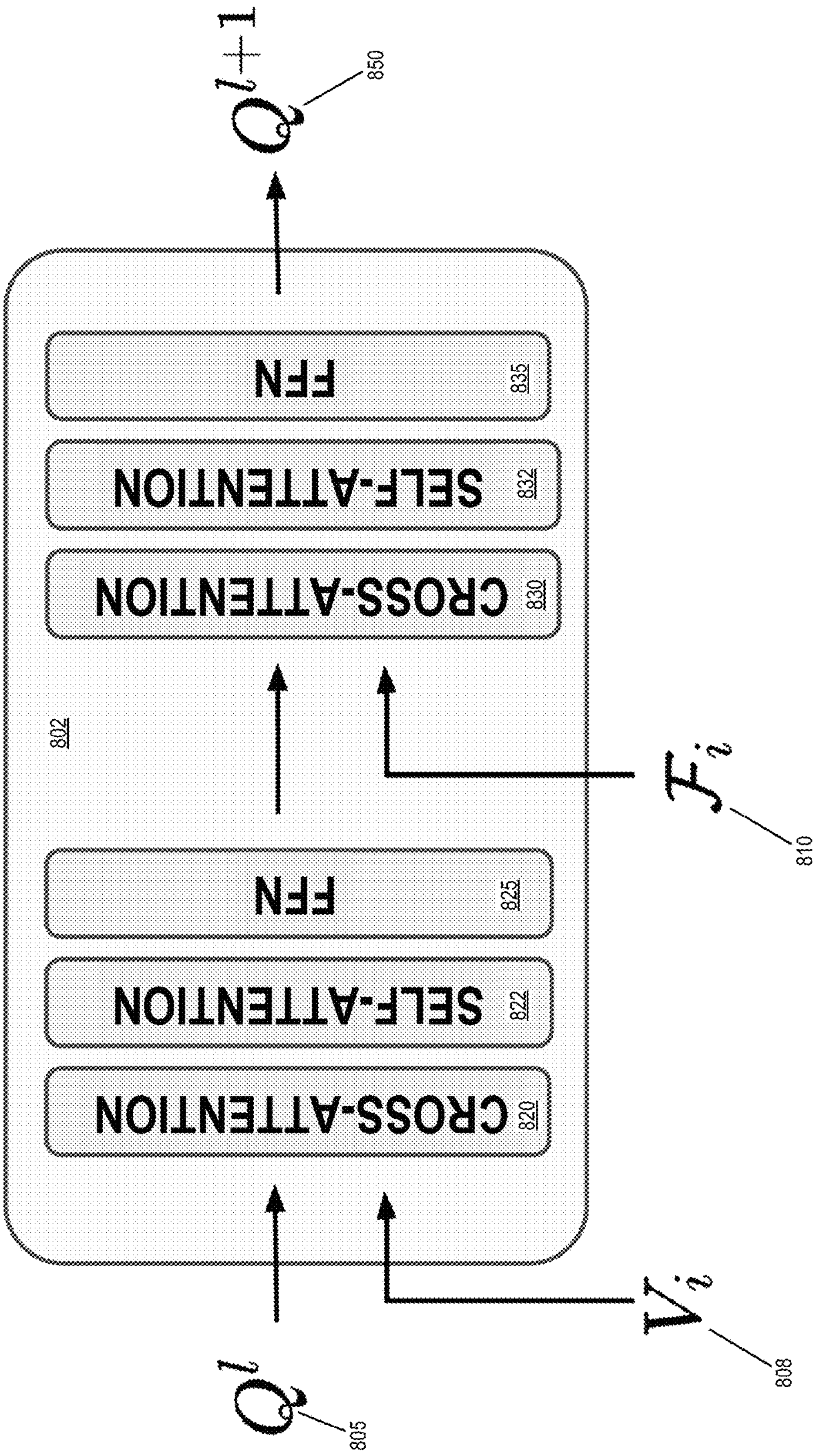

Turning to FIG. 8, the fusion block (802) is a collection of machine learning model layers that are used within a machine learning model, such as a panoptic decoder model. The fusion block (802) includes multiple layers to combine information from the set of queries (805), the voxel features (808), and the image features (810) to generate the set of updated queries (850).

The set of queries (805) are collections of data that may correspond to objects of a scene. Each query of the set of queries (805) may include a feature vector. The values of the feature vector may correspond to features of objects from a scene. The queries of the set of queries (805) may be randomly initialized by the system then refined by one or more of the fusion blocks (802) to generate the set of updated queries (850).

The voxel features (808) are collections of data that may be organized by voxel. Each voxel may correspond to a feature vector that describes objects from the scene at the location of the voxel.

The image features (810) are collections of data that may be organized relative to the pixels of images captured from a scene.

The cross-attention layer (820) is a machine learning model layer that processes the set of queries (805) with the voxel features (808) to generate an output that is input into the self-attention layer (822). In an embodiment, the cross-attention layer (820) uses query, key, and value matrices to process inputs with an attention algorithm and generate an output. The query matrix may be generated from the set of queries (805) and the key and value matrices may be generated from the voxel features (808).

The self-attention layer (822) is a machine learning model layer that processes the output from the cross-attention layer (820) to provide an input to the feed forward network layer (825). The self-attention layer (822) processes input using sets of query, key, and value matrices with an attention algorithm. Each set of a query, key, and value matrix may be referred to as a head of the self-attention layer (822).

The feed forward network (825) processes the output from the self-attention layer (822) to provide an input for the cross-attention layer (830). The feed forward network (825) refines the inputs to further identify features in a scene.

The cross-attention layer (830) processes the output from the feed forward network (825) (which may have the same dimensionality as the set of queries (805)) with the image features (810) to generate an output that is input to the self-attention layer (832). The query matrices used by the cross-attention layer (830) may be generated from the output from the feed forward network (825). The key and value matrices used by the cross-attention layer (830) may be generated from the image features (810).

The self-attention layer (832) processes output from the cross-attention layer (830) to generate an output, which may be used as an input to the feed forward network layer (835). The self-attention layer (832) processes query, key, and value matrices (generated from the output of the cross-attention layer (830)) with an attention algorithm to refine features for the queries to identify features and objects of a scene.

The feed forward network (835) processes output from the self-attention layer (832) to generate the output that includes the set of updated queries (850). The feed forward network (835) further refines the features within the input to more accurately correspond to the objects and features of the scene.

The set of updated queries (850) are collections of data output from the fusion block (802). The queries of the set of updated queries (850) are refined versions of the queries from the set of queries (805). The feature vectors of the queries of the set of updated queries (850) may more accurately describe the features and objects of a scene, especially as compared to the feature vectors of the input queries which may be random values.

Figure 9:
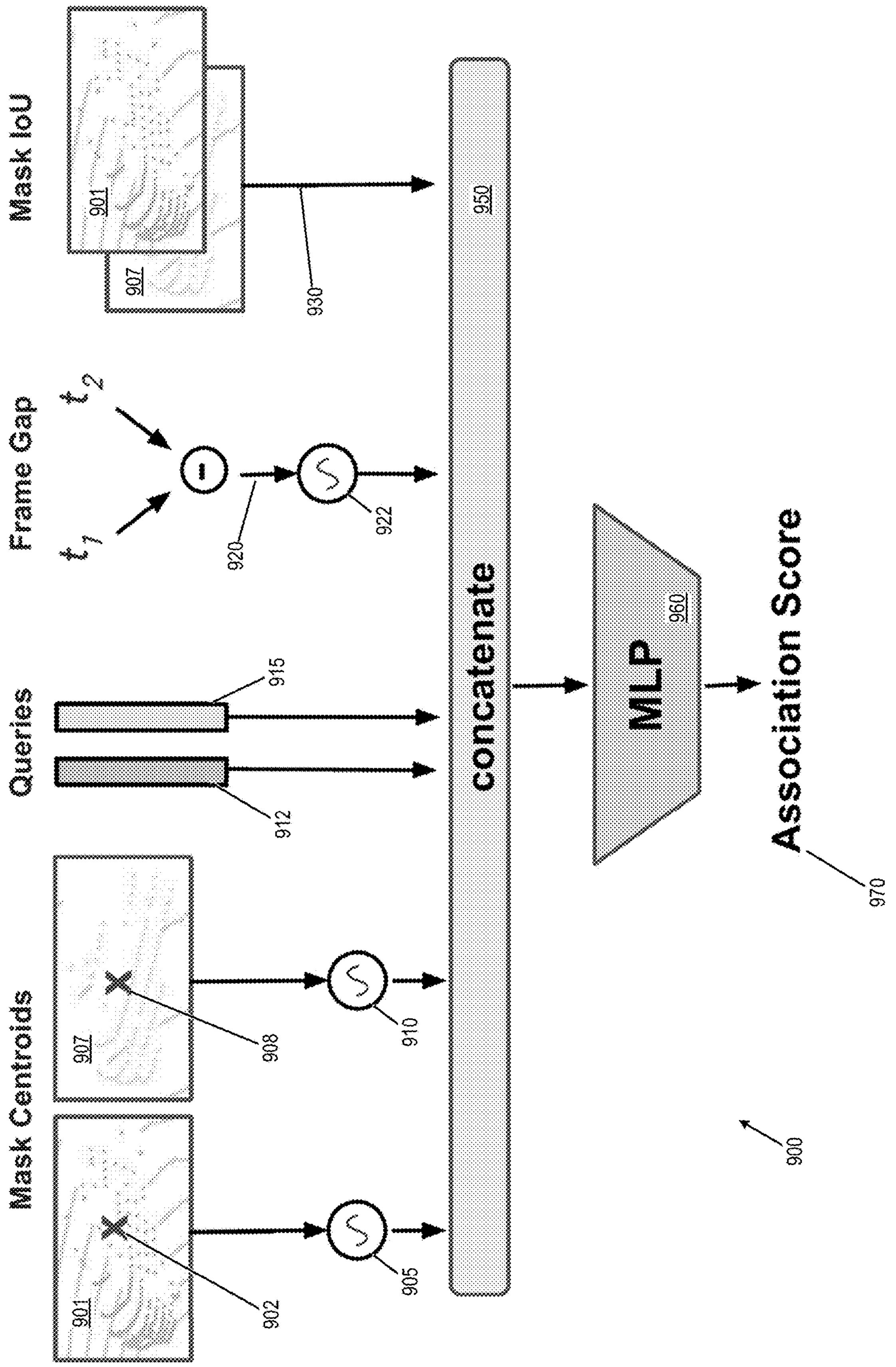

Turning to FIG. 9, the tracklet association module (900) processes several inputs to generate the association score (930) as an output. The tracklet association model (900) is used to identify objects in a tracklet mask that corresponds to objects in previous track masks. Each object identified within a tracklet mask may be compared (i.e., pair wise), to each object from the track mask of the previous iteration to determine which objects in the tracklet mask correspond to which objects in the previous track mask. The determination of which object identifiers in a tracklet mask (e.g., the tracklet mask (901)) correspond to which object identifiers in the previous track mask (e.g., the tracklet mask (907)) may be used to map the object identifiers for the previous track mask to the object identifiers of the current tracklet mask.

The tracklet mask (901) is a portion of a tracklet mask that includes the numerical identifiers for one object from a tracklet mask generated by the panoptic decoder model. The tracklet mask (901) is generated for the current iteration, as compared to the track mask (907), which was generated for a previous iteration.

The tracklet masks centroid (902) is the centroid for the coordinates of an object identified with a numerical identifier in a tracklet mask. The mask centroid coordinates (e.g., x, y, and z coordinates) may be expanded to additional dimensions (e.g., 64 dimensions) by applying sine and cosine activation functions with various frequencies to the centroid using the expansion function (905). the output of the expansion function (905) is input to the combination layer (925).

The track mask (907) includes the numerical identifiers for an object identified in a track mask by the panoptic decoder model. The object identified with the numerical identifiers in the track mask (907) may or may not correspond to the object identified with the numerical identifiers in the tracklet mask (901).

The track mask centroid (908) is the centroid of the coordinates of an object from a track mask for a previous iteration. The track mask centroid (908) may be expanded with the expansion function (910). The expansion function (910) may apply multiple sine and cosine activation functions to the track mask centroid (908) to increase the number of dimensions. The output of the expansion function (910) is input to the combination layer (925).

The queries (912) and (915) are the queries that correspond to the tracklet mask and to the track mask that correspond to the tracklet mask centroid (902) and to the track mask (908). The query (912) is the output from the last fusion block of the panoptic coder model that corresponds to an object. The query (915) corresponds to the updated query output from the last fusion block of the panoptic decoder model for a previous iteration, which was stored to memory. The queries (912) and (915) are input to the combination layer (925).

The frame gap (920) is determined as the duration of time between the current iteration that corresponds to the track mask (901) and the previous iteration that corresponds to the track mask (907). The value of the frame gap (920) may be input into the expansion function (922). The expansion function (922) may expand the value of the frame gap to multiple dimensions using sine and cosine activations.

The intersection over union value (930) is generated from the tracklet mask (901) and the track mask (907). The value (930) is calculated by dividing the points of intersection between the tracklet mask (901) and the track mask (907) by the points of union between the tracklet mask (901) and the track mask (907). The value (930) is an input to the combination layer (925).

The combination layer (950) combines multiple inputs to generate an output that may then be input to the perceptron model (960). In an embodiment, the combination layer (950) may concatenate each of the inputs together to form the output for the perceptron model (960).

The perceptron model (960) is a machine learning model that processes the output from the combination layer (950) to generate the association score (970). the perceptron model (960) is a fully connected network that combines information from each of the inputs to a single scalar value to form the association score (970).

The association score (970) is a value generated by the perceptron model (960). The association score (970) identifies the likelihood that the object corresponding to the numerical identifier in the tracklet mask (901) is the same object as the object corresponding to the numerical identifier for the track mask (907). In an embodiment, the association score may be a continuous value between zero and one.

Figure 10:
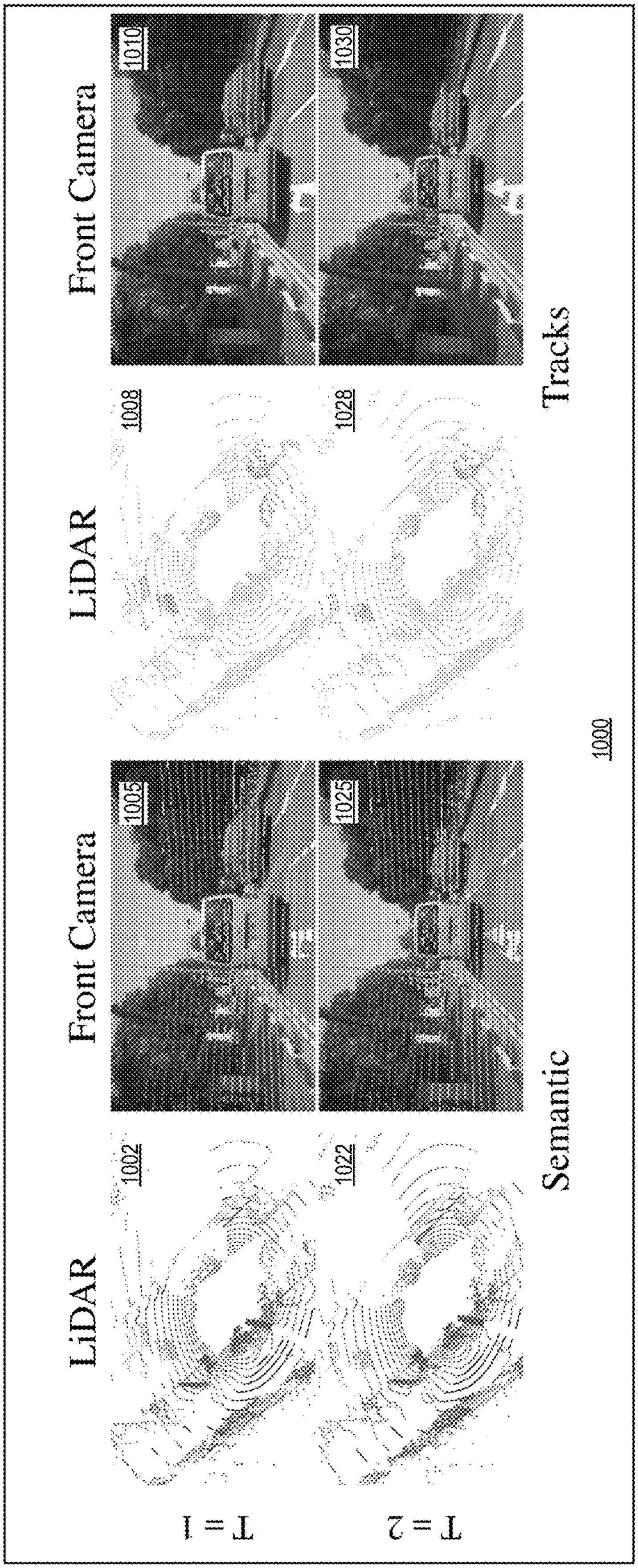

Turning to FIG. 10, the user interface (1000) may display information generated by an autonomous system. The user interface (1000) includes several interface elements (1002) through (1030) to display the information. The interface elements (1002) through (1010) may correspond to a time at iteration one and the interface elements (1022) through (1030) may correspond to a time for a second iteration.

The interface elements (1002) and (1022) display a birds-eye view projection of point cloud information captured with a LiDAR system. The semantic masks are overlayed onto the point clouds and may use colors to code the different types of objects that may be identified with the semantic mask. One color may identify one type of object. As an example, trees may be coded with the color green and a road may be coded with the color cyan, and other vehicles may be coded with the color orange.

The interface elements (1005) and (1025) display images captured with the camera system onto which the semantic information is overlayed. The semantic information is again color coded to identify the type of object at the location in the image. For example, the trees may be overlayed with a projection of green pixels, the road may be overlayed with a projection of cyan colored pixels, and the other vehicles may be overlayed with a projection of orange colored pixels.

The interface elements (1008) and (1028) display a birds-eye view projection of point cloud information onto which track information is overlayed. The numerical identifiers for the different objects (i.e., the other vehicles) identified by the system may be coded with different colors. Each vehicle may have a distinct numerical identifier and a distinct color.

The interface elements (1010) and (1030) display images taken with the camera system onto which the track information is overlayed. Different vehicles may be coded with different colors. For example, the vehicle immediately in front of the autonomous system may have overlayed pixels that are colored green and the vehicle that is in front and to the side of the system may have overlayed pixels that are colored orange.

Figure 11A:
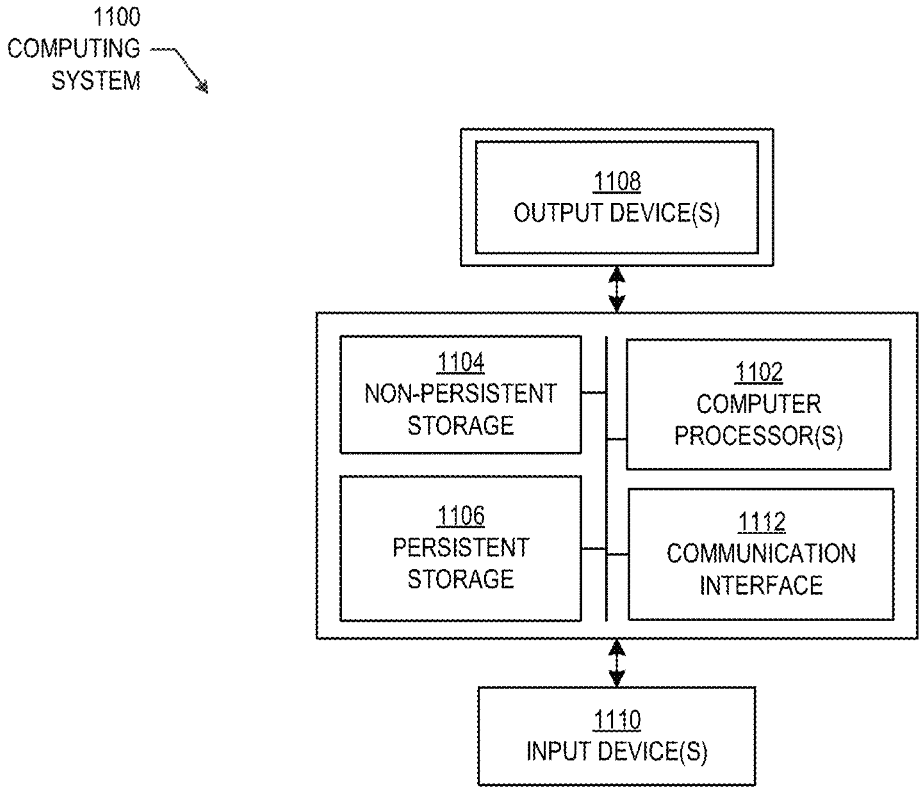
FIG. 11A and FIG. 11B show a computing system in accordance with one or more embodiments of the disclosure.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 11A, the computing system (1100) may include one or more computer processors (1102), non-persistent storage (1104), persistent storage (1106), a communication interface (1112) (e.g., Bluetooth interface, infrared interface, network interface, optical interface, etc.), and numerous other elements and functionalities that implement the features and elements of the disclosure. The computer processor(s) (1102) may be an integrated circuit for processing instructions. The computer processor(s) may be one or more cores or micro-cores of a processor. The computer processor(s) (1102) includes one or more processors. The one or more processors may include a central processing unit (CPU), a graphics processing unit (GPU), a tensor processing units (TPU), combinations thereof, etc.

The input devices (1110) may include a touchscreen, keyboard, mouse, microphone, touchpad, electronic pen, or any other type of input device. The input devices (1110) may receive inputs from a user that are responsive to data and messages presented by the output devices (1108). The inputs may include text input, audio input, video input, etc., which may be processed and transmitted by the computing system (1100) in accordance with the disclosure. The communication interface (1112) may include an integrated circuit for connecting the computing system (1100) to a network (not shown) (e.g., a local area network (LAN), a wide area network (WAN) such as the Internet, mobile network, or any other type of network) and/or to another device, such as another computing device.

Further, the output devices (1108) may include a display device, a printer, external storage, or any other output device. One or more of the output devices may be the same or different from the input device(s). The input and output device(s) may be locally or remotely connected to the computer processor(s) (1102). Many different types of computing systems exist, and the aforementioned input and output device(s) may take other forms. The output devices (1108) may display data and messages that are transmitted and received by the computing system (1100). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 11B:
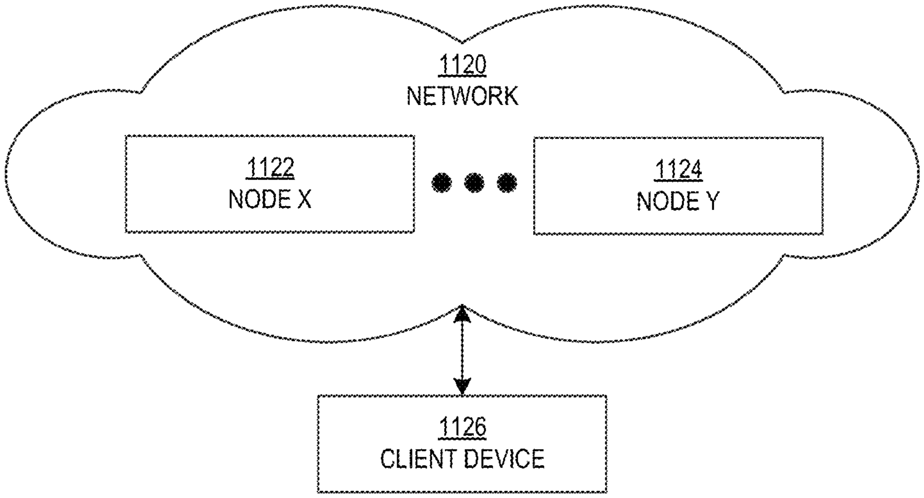

The computing system (1100) in FIG. 11A may be connected to or be a part of a network. For example, as shown in FIG. 11B, the network (1120) may include multiple nodes (e.g., node X (1122), node Y (1124)). Each node may correspond to a computing system, such as the computing system shown in FIG. 11A, or a group of nodes combined may correspond to the computing system shown in FIG. 11A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1100) may be located at a remote location and connected to the other elements over a network.

The nodes (e.g., node X (1122), node Y (1124)) in the network (1120) may be configured to provide services for a client device (1126), including receiving requests and transmitting responses to the client device (1126). For example, the nodes may be part of a cloud computing system. The client device (1126) may be a computing system, such as the computing system shown in FIG. 11A. Further, the client device (1126) may include and/or perform all or a portion of one or more embodiments.

The computing system of FIG. 11A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "set of" may be used to denote one or more of the referenced elements. For example, referring to a "set of X" encompasses at least one instance of X and may include multiple instances of X.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

receiving a set of images and a set of point clouds;

executing an image encoder model using the set of images to extract a set of image feature maps;

executing a point voxel encoder model using the set of image feature maps and the set of point clouds to extract a set of voxel features, a set of image features, and a set of point features;

executing a panoptic decoder model using the set of voxel features, the set of image features, the set of point features, and a set of queries to generate a semantic mask and a track mask, wherein executing the panoptic decoder model comprises:

executing a projection model using the set of voxel features to generate the set of image features; and performing an action responsive to at least one of the semantic mask and the track mask.

2. The method of claim 1, wherein the method further comprises:

matching the set of images to the set of point clouds using a timestamp associated with the set of images and the set of point clouds.

3. The method of claim 1, wherein performing the action comprises:

presenting information from one or more of the semantic mask and the track mask projected onto an image of the set of images.

4. The method of claim 1, wherein performing the action further comprises:

updating a course of an autonomous system using one or more of the semantic mask and the track mask.

5. A method comprising:

receiving a set of images and a set of point clouds;

executing an image encoder model using the set of images to extract a set of image feature maps, wherein executing the image encoder model comprises:

executing a residual network using the set of images to generate a set of intermediate features, and executing a feature pyramid network using the intermediate features to generate the set of image feature maps;

executing a point voxel encoder model using the set of image feature maps and the set of point clouds to extract a set of voxel features, a set of image features, and a set of point features;

executing a panoptic decoder model using the set of voxel features, the set of image features, the set of point features, and a set of queries to generate a semantic mask and a track mask; and performing an action responsive to at least one of the semantic mask and the track mask.

6. A method comprising:

receiving a set of images and a set of point clouds;

executing an image encoder model using the set of images to extract a set of image feature maps;

executing a point voxel encoder model using the set of image feature maps and the set of point clouds to extract a set of voxel features, a set of image features, and a set of point features, wherein executing the point voxel encoder model comprises:

executing one or more perceptron models and one or more convolutional models using the set of point clouds to generate the set of voxel features and the set of point features;

executing a panoptic decoder model using the set of voxel features, the set of image features, the set of point features, and a set of queries to generate a semantic mask and a track mask; and performing an action responsive to at least one of the semantic mask and the track mask.

7. A method comprising:

receiving a set of images and a set of point clouds;

executing an image encoder model using the set of images to extract a set of image feature maps;

executing a point voxel encoder model using the set of image feature maps and the set of point clouds to extract a set of voxel features, a set of image features, and a set of point features;

executing a panoptic decoder model using the set of voxel features, the set of image features, the set of point features, and a set of queries to generate a semantic mask and a track mask, wherein executing the panoptic decoder model further comprises:

executing a set of fusion blocks corresponding to a plurality of sets of voxel features, comprising the set of voxel features, and to a plurality of sets of image features, comprising the set of image features, and executing a fusion block, of the set of fusion blocks, using the set of queries, a self-attention layer, a cross-attention layer with the set of voxel features, and a cross-attention layer with the set of image features, to generate a set of updated queries; and performing an action responsive to at least one of the semantic mask and the track mask.

8. A method comprising:

receiving a set of images and a set of point clouds;

executing an image encoder model using the set of images to extract a set of image feature maps;

executing a point voxel encoder model using the set of image feature maps and the set of point clouds to extract a set of voxel features, a set of image features, and a set of point features;

executing a panoptic decoder model using the set of voxel features, the set of image features, the set of point features, and a set of queries to generate a semantic mask and the track mask, wherein executing the panoptic decoder model comprises:

executing a track association model using a set of tracklet masks, generated from a set of updated queries combined with the set of point features to generate a set of track masks comprising the track mask; and performing an action responsive to at least one of the semantic mask and the track mask.

9. A method comprising:

receiving a set of images and a set of point clouds;

executing an image encoder model using the set of images to extract a set of image feature maps;

executing a point voxel encoder model using the set of image feature maps and the set of point clouds to extract a set of voxel features, a set of image features, and a set of point features;

executing a panoptic decoder model using the set of voxel features, the set of image features, the set of point features, and a set of queries to generate a semantic mask and a track mask, wherein executing the panoptic decoder model comprises:

executing a semantic mask model, comprising a perceptron model, using a set of updated queries from the panoptic decoder model and the set of point features to generate the semantic mask; and performing an action responsive to at least one of the semantic mask and the track mask.

10. A system comprising:

at least one processor; and a non-transitory computer readable medium for causing the at least one processor to perform operations comprising:

receiving a set of images and a set of point clouds, executing an image encoder model using the set of images to extract a set of image feature maps, wherein executing the image encoder model further comprises:

executing a residual network using the set of images to generate a set of intermediate features, and executing a feature pyramid network using the intermediate features to generate the set of image feature maps, executing a point voxel encoder model using the set of image feature maps and the set of point clouds to extract a set of voxel features, a set of image features, and a set of point features, executing a panoptic decoder model using the set of voxel features, the set of image features, the set of point features, and a set of queries to generate a semantic mask and a track mask, and performing an action responsive to at least one of the semantic mask and the track mask.

11. A system comprising:

at least one processor; and a non-transitory computer readable medium for causing the at least one processor to perform operations comprising:

receiving a set of images and a set of point clouds, executing an image encoder model using the set of images to extract a set of image feature maps, executing a point voxel encoder model using the set of image feature maps and the set of point clouds to extract a set of voxel features, a set of image features, and a set of point features, wherein executing the point voxel encoder model comprises:

executing one or more perceptron models and one or more convolutional models using the set of point clouds to generate the set of voxel features and the set of point features, executing a panoptic decoder model using the set of voxel features, the set of image features, the set of point features, and a set of queries to generate a semantic mask and a track mask, and performing an action responsive to at least one of the semantic mask and the track mask.

12. A system comprising:

at least one processor; and a non-transitory computer readable medium for causing the at least one processor to perform operations comprising:

receiving a set of images and a set of point clouds, executing an image encoder model using the set of images to extract a set of image feature maps, executing a point voxel encoder model using the set of image feature maps and the set of point clouds to extract a set of voxel features, a set of image features, and a set of point features, executing a panoptic decoder model using the set of voxel features, the set of image features, the set of point features, and a set of queries to generate a semantic mask and a track mask, wherein executing the panoptic decoder model comprises:

executing a projection model using the set of voxel features to generate the set of image features, and performing an action responsive to at least one of the semantic mask and the track mask.

13. The system of claim 12, wherein the non-transitory computer readable medium causes the at least one processor to perform operations comprising:

matching the set of images to the set of point clouds using a timestamp associated with the set of images and the set of point clouds.

14. The system of claim 12, wherein performing the action comprises:

presenting information from one or more of the semantic mask and the track mask projected onto an image of the set of images.

15. A system comprising:

at least one processor; and a non-transitory computer readable medium for causing the at least one processor to perform operations comprising:

receiving a set of images and a set of point clouds, executing an image encoder model using the set of images to extract a set of image feature maps, executing a point voxel encoder model using the set of image feature maps and the set of point clouds to extract a set of voxel features, a set of image features, and a set of point features, executing a panoptic decoder model using the set of voxel features, the set of image features, the set of point features, and a set of queries to generate a semantic mask and a track mask, wherein executing the panoptic decoder model comprises:

executing a set of fusion blocks corresponding to a plurality of sets of voxel features, comprising the set of voxel features, and to a plurality of sets of image features, comprising the set of image features, and executing a fusion block, of the set of fusion blocks, using the set of queries, a self-attention layer, a cross-attention layer with the set of voxel features, and a cross-attention layer with the set of image features, to generate a set of updated queries, and performing an action responsive to at least one of the semantic mask and the track mask.

16. A system comprising:

at least one processor; and a non-transitory computer readable medium for causing the at least one processor to perform operations comprising:

receiving a set of images and a set of point clouds, executing an image encoder model using the set of images to extract a set of image feature maps, executing a point voxel encoder model using the set of image feature maps and the set of point clouds to extract a set of voxel features, a set of image features, and a set of point features, executing a panoptic decoder model using the set of voxel features, the set of image features, the set of point features, and a set of queries to generate a semantic mask and the track mask, wherein executing the panoptic decoder model comprises:

executing a track association model using a set of tracklet masks, generated from a set of updated queries combined with the set of point features to generate a set of track masks comprising the track mask, and performing an action responsive to at least one of the semantic mask and the track mask.

17. A system comprising:

at least one processor; and a non-transitory computer readable medium for causing the at least one processor to perform operations comprising:

receiving a set of images and a set of point clouds, executing an image encoder model using the set of images to extract a set of image feature maps, executing a point voxel encoder model using the set of image feature maps and the set of point clouds to extract a set of voxel features, a set of image features, and a set of point features, executing a panoptic decoder model using the set of voxel features, the set of image features, the set of point features, and a set of queries to generate a semantic mask and a track mask, wherein executing the panoptic decoder model comprises:

executing a semantic mask model, comprising a perceptron model, using a set of updated queries from the panoptic decoder model and the set of point features to generate the semantic mask, and performing an action responsive to at least one of the semantic mask and the track mask.

18. A non-transitory computer readable medium comprising computer readable program code for causing a computer system to perform operations comprising:

receiving a set of images and a set of point clouds;

executing an image encoder model using the set of images to extract a set of image feature maps;

executing a point voxel encoder model using the set of image feature maps and the set of point clouds to extract a set of voxel features, a set of image features, and a set of point features;

executing a panoptic decoder model using the set of voxel features, the set of image features, the set of point features, and a set of queries to generate a semantic mask and a track mask, wherein executing the panoptic decoder model further comprises:

executing a projection model using the set of voxel features to generate the set of image features; and performing an action responsive to at least one of the semantic mask and the track mask.

* * * * *